(12) United States Patent
Iwamoto

(10) Patent No.: US 11,889,041 B2
(45) Date of Patent: Jan. 30, 2024

(54) PRINTING SYSTEM AND PRINTING APPARATUS

(71) Applicant: SEIKO EPSON CORPORATION, Tokyo (JP)

(72) Inventor: Masaharu Iwamoto, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/185,131

(22) Filed: Mar. 16, 2023

(65) Prior Publication Data
US 2023/0300273 A1 Sep. 21, 2023

(30) Foreign Application Priority Data
Mar. 17, 2022 (JP) ................................ 2022-042510

(51) Int. Cl.
*G03G 15/095* (2006.01)
*H04N 1/34* (2006.01)
*H04N 1/00* (2006.01)

(52) U.S. Cl.
CPC ......... *H04N 1/342* (2013.01); *H04N 1/00068* (2013.01); *H04N 1/00909* (2013.01)

(58) Field of Classification Search
CPC .... H04N 1/344; H04N 1/346; H04N 1/00068; G03G 21/10
USPC ........ 358/1.13, 1.15; 399/8, 35, 34, 71, 358; 347/36
See application file for complete search history.

(56) References Cited

U.S. PATENT DOCUMENTS

| 2003/0030835 A1* | 2/2003 | Yoshida ................. G06K 15/00 358/1.14 |
| 2006/0253404 A1 | 11/2006 | Horii et al. |
| 2012/0076518 A1* | 3/2012 | Rapkin .................. G03G 15/55 399/24 |

FOREIGN PATENT DOCUMENTS

JP 2002-036582 A 2/2002

* cited by examiner

*Primary Examiner* — Jamares Q Washington
(74) *Attorney, Agent, or Firm* — WORKMAN NYDEGGER

(57) ABSTRACT

A printing system includes a company server and a printing apparatus. The printing apparatus is used in business-use printing and private-use printing. The printing apparatus includes: a printing section performing printing on a medium by using a printing agent; and a waste agent collecting section collecting as a waste agent, the portion of the printing agent that is consumed by the printing section but is discarded without being used in printing on the medium. The printing system includes a determination section and an estimation section. The determination section determines whether the printing agent as the waste agent is discarded in business-use printing or private-use printing. The estimation section estimates an amount of printing agent determined by the determination section to be discarded in business-use printing.

14 Claims, 8 Drawing Sheets

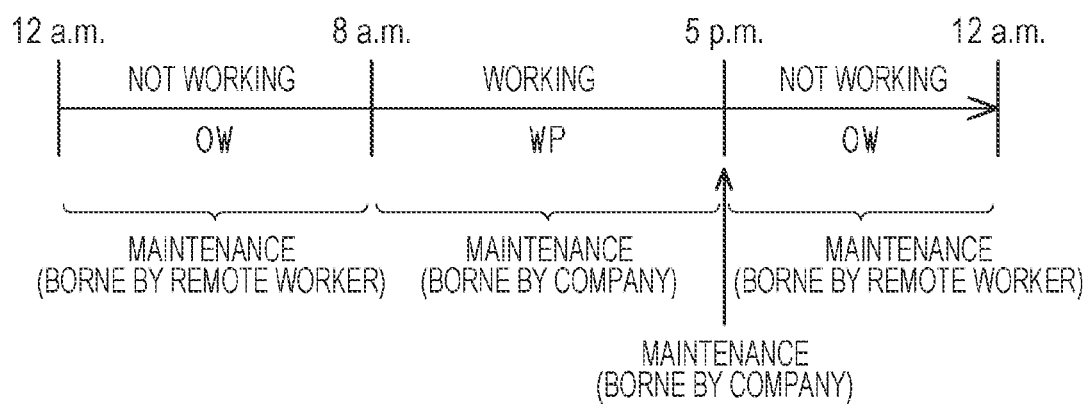

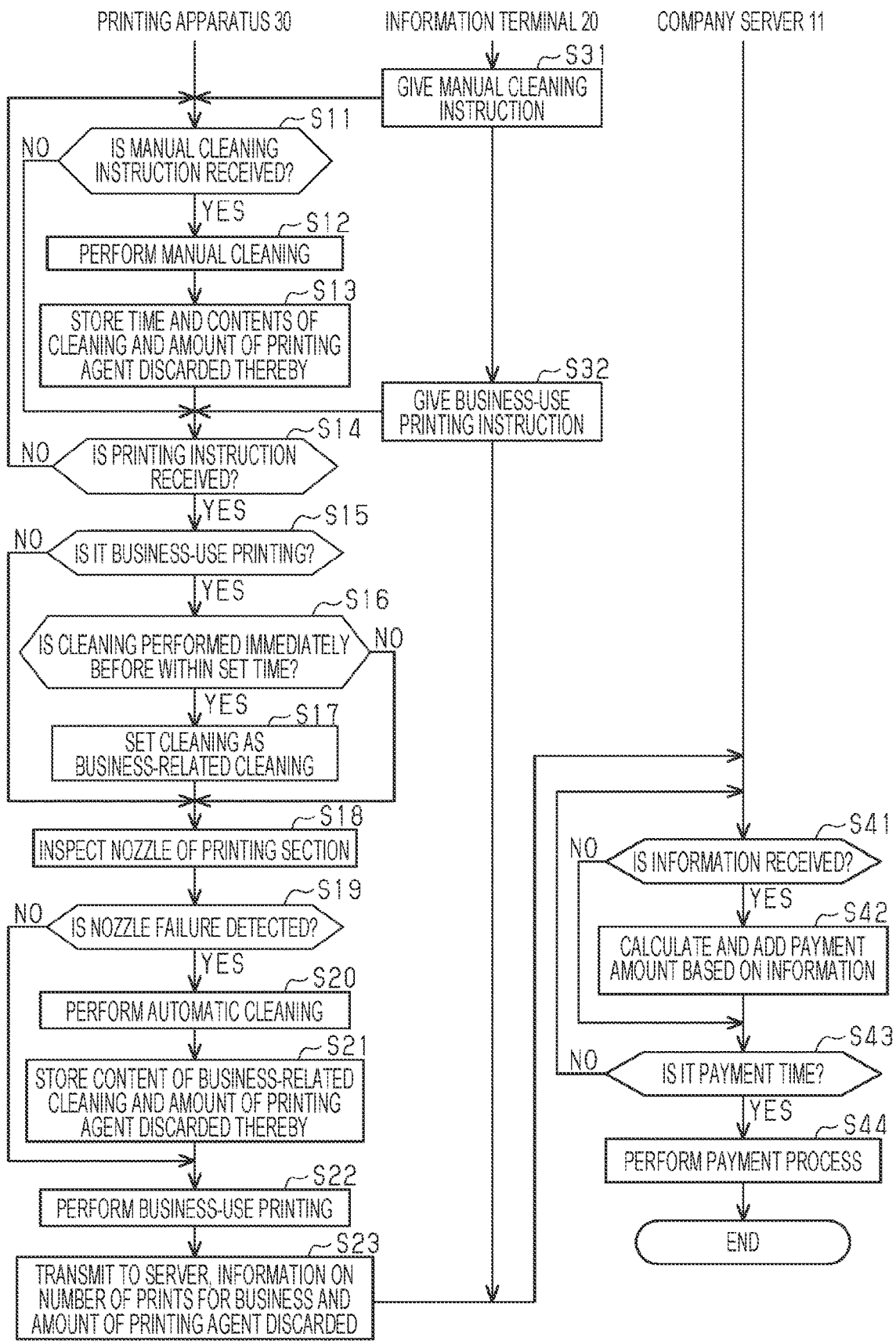

PRINTING SYSTEM AND PRINTING APPARATUS

The present application is based on, and claims priority from JP Application Serial Number 2022-042510, filed Mar. 17, 2022, the disclosure of which is hereby incorporated by reference herein in its entirety.

BACKGROUND

1. Technical Field

The present disclosure relates to a printing system including a server and a printing apparatus that performs printing on a medium and to the printing apparatus.

2. Related Art

As described in JP-A-2002-36582, for example, a charging apparatus is known which charges a fee depending on the actual amount of printing agent, such as ink, consumed by a printing apparatus, such as a printer. In recent years, more employees remotely connect to company servers and conduct business at their home, that is, work from home. When an employee conducts business in a second place, such as the employee's home, which is distant from a first place, such as a company, as described above, printing for business is sometimes required in the second place. In such a case, the remote worker or the like uses his/her privately-owned printing apparatus for business-use printing that is printing necessary for business.

It is proper that the cost of business-use printing is borne by the company. For example, the charging apparatus described in JP-A-2002-36582 can be applied. The remote worker installs a printing apparatus exclusive to business use at his/her home, and the company bears the fee charged by the charging apparatus.

In such a case, it is necessary to install a printing apparatus exclusive to business use at the home of the remote worker. When the remote worker has his/her private printing apparatus, the remote worker needs to install plural printing apparatuses including the printing apparatus exclusive to business use and the his/her private printing apparatus at the home. For the company, when the printing apparatus exclusive to business use is used for private-use printing, the company bears the cost of private-use printing in some cases. It is therefore desirable that business-use printing is performed with a privately-owned printing apparatus while the cost thereof is borne by the company.

At working from home or in other similar situations, the remote worker or the like needs to purchase printing agent supply sources, including printing agent cartridges to be mounted on his/her private printing apparatus and printing agent bottles for supplying the printing agent to printing agent tanks of the printing apparatus, at his/her own expense. When the company or the like pays the cost required for printing, for example, the amount of payment is generally a fixed flat amount, an amount depending on the number of prints, or the like. However, a part of the printing agent supplied to the printing apparatus from the printing agent supply sources purchased by the remote worker or the like at his/her own expense is discarded without being used for printing in some cases. For example, the printing agent consumed by maintenance is discarded without being used for printing. In addition to maintenance, the printing agent is discarded in some cases because of other reasons depending on the printing manner of the printing apparatus and the like.

It is proper that the cost of the printing agent discarded in such a manner is paid by the company or the like in addition to the cost of prints. When the remote worker or the like performs business-use printing by using his/her private printing apparatus, it is therefore desirable to identify the amount of printing agent discarded in business-use printing.

SUMMARY

A printing system to solve the aforementioned problem is a printing system including: a server provided in a first place; and a printing apparatus that is provided in a second place and is used in business-use printing and private-use printing, in which the printing apparatus includes: a printing section performing printing on a medium using a printing agent; a waste agent collecting section collecting as a waste agent, a portion of the printing agent that is consumed by the printing section but is discarded without being used in printing on the medium; a determination section determining whether the printing agent as the waste agent is discarded in the business-use printing or the private-use printing; and an estimation section estimating an amount of printing agent determined by the determination section to be discarded in the business-use printing.

A printing apparatus to solve the aforementioned problem is a printing apparatus used in business-use printing and private-use printing, the printing apparatus including: a printing section performing printing on a medium using a printing agent that is supplied from a printing agent accommodating section accommodating the printing agent; a waste agent collecting section collecting as a waste agent, a portion of the printing agent that is consumed by the printing section but is discarded without being used in printing on the medium; a determination section determining whether the printing agent as the waste agent is discarded in the business-use printing or the private-use printing; and an estimation section estimating an amount of printing agent determined by the determination section to be discarded in the business-use printing.

BRIEF DESCRIPTION OF THE DRAWINGS

FIG. 7 is a schematic diagram illustrating a management table.

FIG. 8 is an explanatory diagram illustrating who bears cost of printing agent consumed by maintenance.

FIG. 13 is a sequence chart for explaining processing of the printing system.

DESCRIPTION OF EXEMPLARY EMBODIMENTS

Hereinafter, an embodiment of a printing system is described with reference to the drawings.

Configuration of Printing System 10

Figure 1:
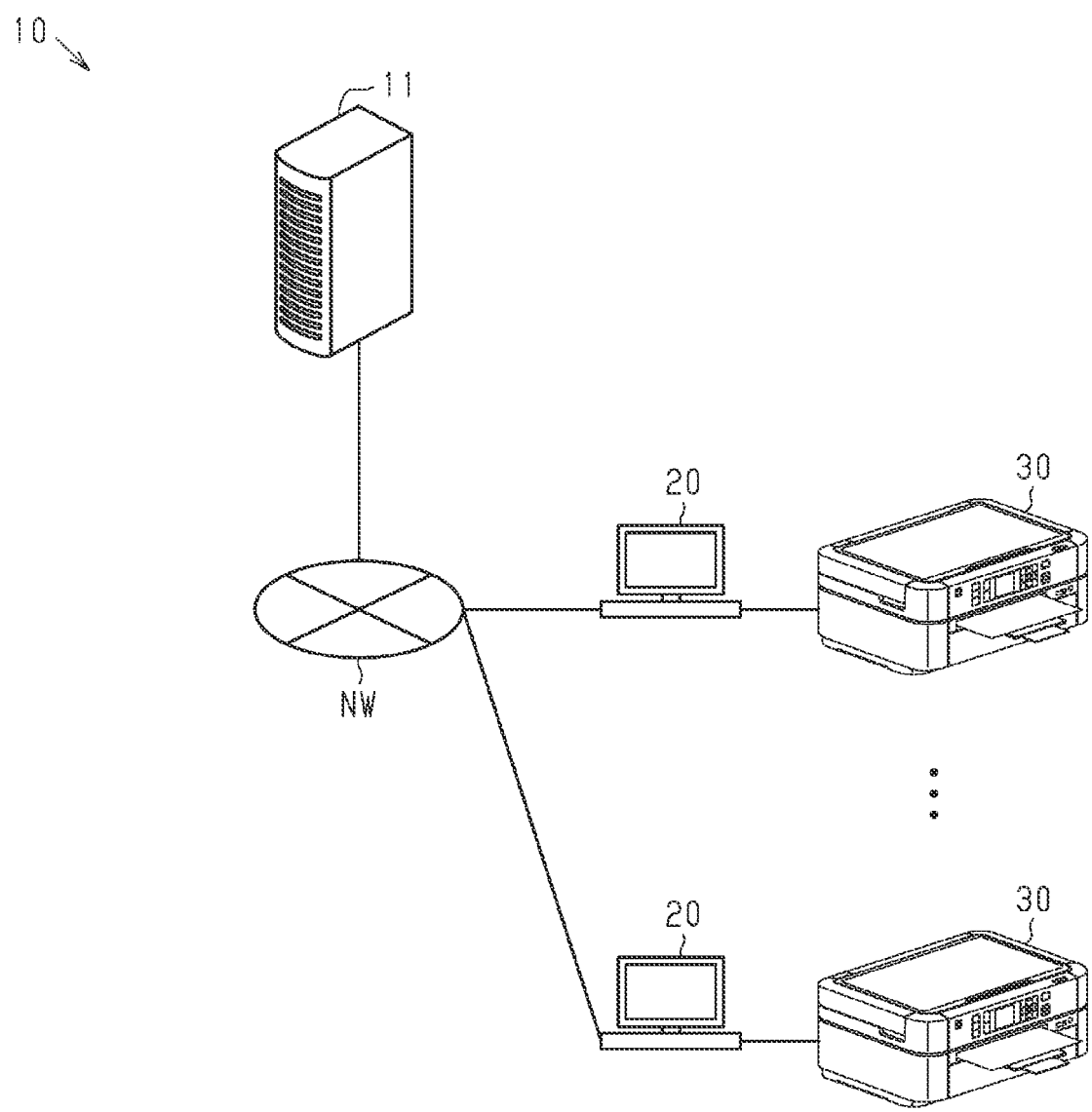
FIG. 1 is a schematic diagram illustrating a printing system of an embodiment.

A printing system 10 illustrated in FIG. 1 includes: a company server 11 as an example server provided in a first place; and a printing apparatus 30 that is provided in a second place and is used in business-use printing and private-use printing. The printing apparatus 30 is a printing apparatus 30 privately owned by a remote worker, for example. When the remote worker needs to do business-use printing during work from home, the operation state of business-use printing or the like by the remote worker is managed by the company server 11 so that the company could pay the cost for business-use printing. The printing system 10 therefore includes the company server 11 provided in the first place, such as the company, and the privately owned printing apparatus 30 provided in the second place, which is the home of an employee as the remote worker, for example.

As illustrated in FIG. 1, the printing system 10 includes the company server 11 including a company's attendance management system 13 (see FIG. 6) and at least one printing apparatus 30. The printing system 10 may further include an information terminal 20 that is coupled to the printing apparatus 30 so as to communicate with the same. The company server 11 may be installed in the first place, such as a company office, for example, or may be installed in the first place, such as an office of a contractor to which the company outsources. The printing apparatus 30 and information terminal 20 are provided in the second place, such as the remote worker's home or a satellite office. In this embodiment, the first place is the company, and the second place is the home of an employee who owns the printing apparatus 30.

The printing apparatus 30 is an ink jet printer that performs printing by ejecting ink as an example of liquid onto a medium, such as paper. The printing apparatus 30 is an apparatus ejecting liquid, such as ink, onto a medium, such as paper. The printing apparatus 30 therefore can be a liquid ejecting apparatus. The printing apparatus 30 may be a printing apparatus that performs printing in a different manner from the ink-jet method.

In the printing system 10, the company server 11 collects from the printing apparatus 30 directly or through the information terminal 20, information for paying to the remote worker, the cost of business-use printing performed by the printing apparatus 30. In this embodiment, the company server 11 collects information that is necessary for calculating the cost of the printing agent discarded in business-use printing without being used in prints and that relates to the amount of printing agent discarded. In the ink jet type printing apparatus 30 of this embodiment, the discarded printing agent is ink (waste ink) as an example of the printing agent discarded mainly by maintenance. In order to identify the cost of the printing agent discarded in association with business in business-use printing in the printing apparatus 30, the printing system 10 acquires the amount of printing agent discarded in business-use printing.

The cost of business-use printing is paid as unit price per print multiplied by the number of prints, for example. However, when the amount of payment is managed by the number of prints in such a manner, generally, the company does not pay the cost of the printing agent consumed by maintenance. This is because it is difficult to determine whether the maintenance is business-related maintenance necessary for business-use printing. In addition, the amount of printing agent consumed (discarded) by maintenance is significantly smaller than the amount of printing agent consumed by printing. The cost depending on the amount of printing agent consumed (discarded) by maintenance therefore tends to be neglected. However, for a home printer, such as the printing apparatus 30, the cost for all the printing agent, such as ink, including the amount of printing agent discarded, is borne by the remote worker or the like at his/her own expense. The amount of printing agent discarded by maintenance or the like depends on the contents of business, the frequency of printing, the environment in the second place, including temperature and humidity, and the like. When a larger amount of printing agent is discarded due to maintenance at higher frequency or the like, the printing agent discarded accounts for a larger part of cost required for printing.

In addition to the printing cost for business-use printing performed by the printing apparatus 30, the printing system 10 of the embodiment is configured to pay to the remote worker, the cost depending on the amount of printing agent that is consumed (discarded) by business-related maintenance estimated to be necessary for business-use printing. The printing system 10 therefore identifies the amount of printing agent consumed (discarded) by business-related maintenance, which is necessary for calculating the cost of the printing agent consumed (discarded) by business-related maintenance.

The printing system 10 includes the company server 11 and the printing apparatus 30. The printing system 10 may include the information terminal 20 intervening between the printing apparatus 30 and the company server 11. The information terminal 20 serves as a host apparatus used to instruct the printing apparatus 30 to perform printing, for example. The information terminal 20 is composed of a personal computer, for example. The information terminal 20 is coupled to the printing apparatus 30 so as to communicate with the same by wire or wirelessly. The information terminal 20 is coupled to the company server 11 so as to communicate with the same through a network NW.

The printing apparatus 30 is a home printer privately owned by an employee or the like as the remote worker. The printing apparatus 30 is installed in the second place, such as the home from which the employee performs remote work. The second place where the printing apparatus 30 is installed is not limited to the employee's home and may be a satellite office from which the employee performs remote work. The information terminal 20 is installed in the second place such as the home of the employee or the like or a satellite office (hereinafter, also referred to as the employee's home or the like). The information terminal 20 is used by the remote worker or the like to instruct the printing apparatus 30 to perform printing. The information terminal 20 is therefore provided at the remote worker's home, similar to the printing apparatus 30, or is carried by the remote worker or the like. The information terminal 20 may be in the second place different from the remote worker's home or the like where the printing apparatus 30 is provided as long as the information terminal 20 is able to instruct the printing apparatus 30 to perform printing.

Configuration of Printing Apparatus 30

Figure 2:
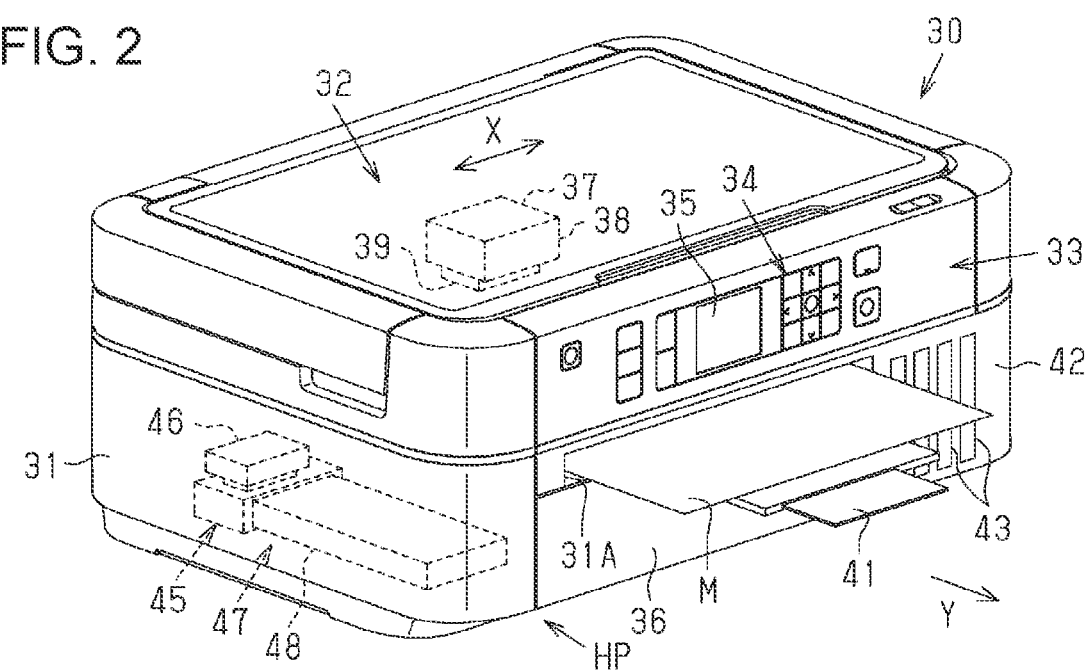
FIG. 2 is a perspective view of a printing apparatus.

Next, the configuration of the printing apparatus 30 is described in detail with reference to FIG. 2. In FIG. 2, the printing apparatus 30 is assumed to be situated on the horizontal plane.

As illustrated in FIG. 2, the printing apparatus 30 includes: a printing section 37 performing printing on a medium M using a printing agent such as ink; and a waste agent collecting section 47 collecting as a waste agent, the portion of the printing agent that is consumed by the printing section 37 but is discarded without being used in printing on the medium M. The waste agent collecting section 47 includes a replaceable waste agent accommodating section 48 accommodating the collected waste agent.

The printing apparatus 30 of the embodiment includes a maintenance section 45 performing maintenance of the printing section 37. The amount of printing agent discarded is an amount of printing agent discarded from the printing section 37 by maintenance.

Within the printing agent consumed by the printing section 37, the portion of the printing agent consumed by the maintenance section 45, which performs maintenance of the printing section 37, is discarded without being used in printing on the medium M. For example, the amount of printing agent consumed in the process of business-use printing by maintenance performed in the business-use printing is the amount of printing agent that would not have been consumed if business-use printing had not been performed. The waste agent accommodating section 48, which accommodates the printing agent consumed by maintenance as the waste agent, is detachably provided for the waste agent collecting section 47. To be specific, the printing apparatus 30 including such a maintenance function is configured as follows.

As illustrated in FIG. 2, the printing apparatus 30 includes a substantially rectangular box-shaped body 31. The printing apparatus 30 includes an image reading section 32 above the body 31. In other words, the printing apparatus 30 may be a multifunction machine including the image reading section 32. The printing apparatus 30 as a multifunction machine includes a scanner function of reading an original, a copy function of copying an original, and a printing function of printing characters or images on the medium M. The printing apparatus 30 performs printing on the medium M using the printing agent in the copy and printing processes. In the printing apparatus 30, therefore, the printing agent is consumed in the copy and printing processes. The printing apparatus 30 of the embodiment is an ink jet printer, for example, and prints on the medium M by ejecting ink as an example of the printing agent. The printing apparatus 30 may include an auto sheet feeder configured to be powered by a drive source, such as a motor, to transport an original sheet by sheet. In this case, the image reading section 32 may include a feed-type reading function of reading an original fed by the auto sheet feeder and a flatbed-type reading function of reading an original set on a document glass.

The printing apparatus 30 includes an openable cover 33 above the body 31. The image reading section 32 is opened and closed together with the cover 33. The cover 33 is opened and closed between the closed position illustrated in FIG. 2 and the opened position at which the inside of the body 31 is exposed. The user is able to refill the printing apparatus 30 with the printing agent by opening the cover 33, for example.

The printing apparatus 30 includes an input section 34 and a display section 35. The input section 34 is configured to be operable by the user. The display section 35 displays various types of images. For example, the display section 35 displays a menu screen and various types of message information. The display section 35 may be composed of a touch panel, for example. In this case, the input section 34, which is operated by the user to accept inputs, may be composed of an operation function of the touch panel. The input section 34 may be composed of a mechanical switch.

The printing apparatus 30 includes a paper cassette 36. The paper cassette 36 is provided in the bottom of the body 31. The paper cassette 36 is mounted in the body 31 so as to be inserted and removed. The paper cassette 36 is configured to accommodate plural media M, such as sheets of paper. The printing apparatus 30 includes a transporting section 40 (see FIG. 6) that feeds the medium M from the paper cassette 36 and transports the fed medium M along a predetermined transporting path.

The printing apparatus 30 includes a printing section 37 performing printing on the medium M fed from the paper cassette 36. The printing section 37 prints on the medium M using the printing agent, such as ink. The printing section 37 includes: a carriage 38 movably provided within the body 31; and a printing head 39 provided under the carriage 38. The printing head 39 is a liquid ejecting head that ejects liquid, such as ink, as an example of the printing agent, for example. While the carriage 38 reciprocates along a transverse axis X, which is transverse to a transportation direction Y of the medium M, the printing head 39 ejects ink as an example of the printing agent toward the medium M to print characters or images on the medium M.

The printing apparatus 30 includes an outlet 31A outputting the printed medium M. The printing apparatus 30 includes an output tray 41 holding the medium M outputted from the outlet 31A. The output tray 41 may be slidably provided in the front of the body 31.

As illustrated in FIG. 2, the carriage 38 is located at a home position HP, which is the position of an end of the travel path of the carriage 38, when printing is not being performed. The maintenance section 45 includes a cap 46 at the position opposite to the position where the printing head 39 is located when the carriage 38 is located at the home position HP.

As illustrated in FIG. 2, the printing apparatus 30 includes the waste agent accommodating section 48, which accommodates the waste agent, such as waste ink, that is discarded by maintenance performed by the maintenance section 45.

The printing apparatus 30 includes the printing agent accommodating section 42. The printing agent accommodating section 42 includes plural accommodating sections 43 accommodating the printing agent. The printing agent accommodating section 42 of the embodiment includes the same number of accommodating sections 43 as the number of colors that the printing section 37 is able to print on the medium M. The plural accommodating sections 43 individually accommodate liquid, such as ink, of respective colors. The body 31 includes plural windows in the front face of the printing agent accommodating section 42 to allow the user to see the level of liquid in the accommodating sections 43.

Figure 3:
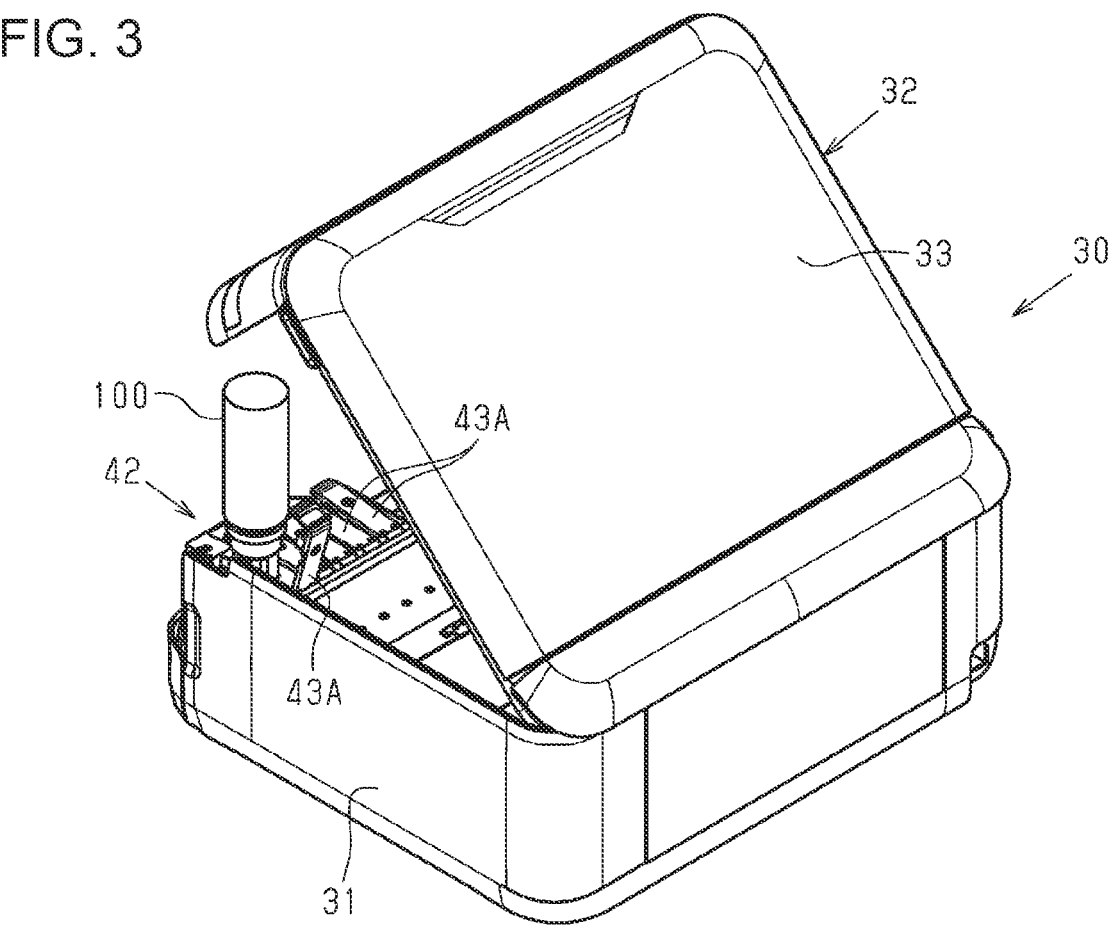
FIG. 3 is a perspective view of the printing apparatus as seen from the back.

As illustrated in FIG. 3, while the cover 33 is opened, the printing agent accommodating section 42 located within the body 31 is exposed. The printing agent accommodating section 42 includes an openable lid 43A for each of the accommodating sections 43. When the amount of liquid accommodated in any accommodating section 43 is small, the user opens the corresponding lid 43A and inserts a supply section (not illustrated) of a bottle 100 into a supply port (not illustrated) of the corresponding accommodating section 43 to refill the accommodating section 43 from the bottle 100 with the liquid printing agent, such as ink.

When the level of printing agent, such as ink, to be supplied to the printing head 39 in the printing apparatus 30 reaches the end, the user supplies the printing agent to the printing apparatus 30. When the liquid supply source is a liquid tank, the liquid tank is refilled with liquid, such as ink as an example of the printing agent, through the bottle 100. When the printing apparatus 30 has a configuration in which the liquid supply source is a liquid cartridge, such as an ink cartridge, the user replaces the liquid cartridge mounted on the printing apparatus 30. It is therefore necessary to prepare a new bottle 100 or liquid cartridge, for example, before the printing apparatus 30 runs out of liquid (the level of liquid reaches the end). In other words, the employee as the user needs to prepare the bottle 100 or liquid cartridge for use in supplying the printing agent to the printing apparatus 30 owned by himself/herself.

The printing section 37 illustrated in FIG. 2 may be a line recording type in which the printing head 39 is composed of a line head, instead of the serial recording type in which the printing head 39 reciprocates along the transverse axis X together with the carriage 38 for printing on the medium M.
Configuration of Maintenance Section 45 and Waste Agent Collecting Section 47 and Maintenance Contents Next, the configurations of the maintenance section 45 and waste agent collecting section 47 and the contents of maintenance are described with reference to FIGS. 4 and 5.

Figure 4:
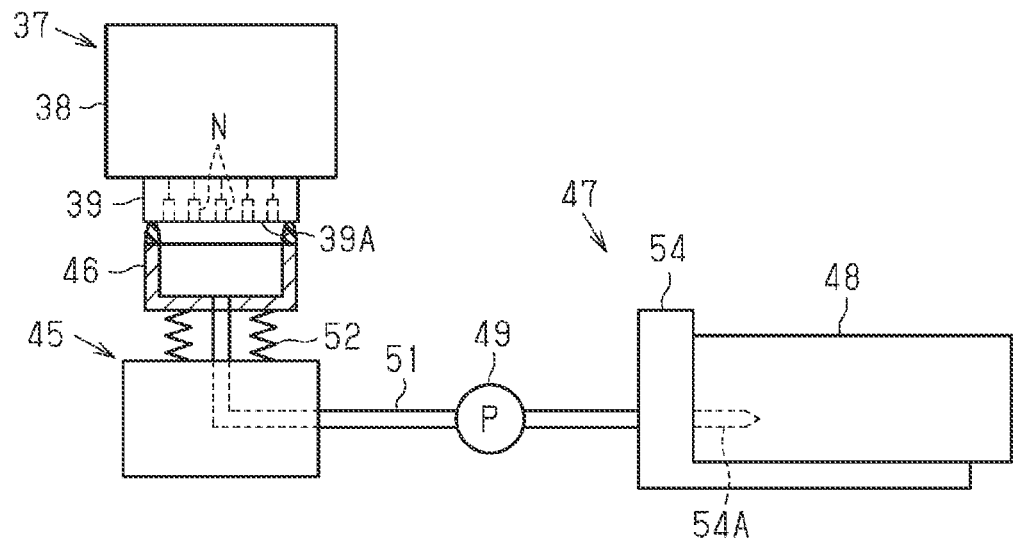
FIG. 4 is a schematic diagram illustrating a maintenance section and a waste agent collecting section in the process of cleaning.

As illustrated in FIG. 4, the maintenance section 45 is located under the printing section 37 when the printing section 37 is located at the home position HP. The maintenance section 45 performs maintenance of the printing head 39 of the printing section 37.

The printing head 39 includes a nozzle face 39A in which nozzles N for ejecting the printing agent, such as ink, are opened. The maintenance section 45 is configured to move to a capping position where the cap 46 is in contact with the nozzle face 39A, in which the nozzles N of the printing head 39 are opened, and a retracted position where the cap 46 is spaced from the nozzle face 39A. When the printing head 39 is located at the home position HP and the cap 46 is elevated to such a height position that the cap 46 comes into contact with the nozzle face 39A, the printing head 39 is capped with the cap 46. This reduces an increase in viscosity and drying of the printing agent, such as ink, within the nozzles N of the printing head 39.

As a maintenance process, the maintenance section 45 performs cleaning to force liquid out of the nozzles N of the printing head 39. The maintenance section 45 performs flushing (idle ejection) to regularly move the printing head 39 to the home position HP during printing and cause the printing agent, such as ink, to be ejected through the nozzles N. The maintenance performed by the maintenance section 45 is described in detail later.

The maintenance section 45 includes the cap 46, which caps the printing head 39 when the carriage 38 is located at the home position HP. Capping the printing head 39 with the cap 46 reduces an increase in viscosity and drying of the printing agent, such as ink, within the nozzles N of the printing head 39. When ink within the nozzles N has higher viscosity, when ink within the nozzles N includes air bubbles, or when foreign matters, including paper dust, stick to the nozzles N, clogging of the nozzles N will cause ejection failure that prevents liquid from being ejected normally from the nozzles N. The maintenance section 45 may include a wiper (not illustrated) to wipe out the nozzle face 39A of the printing head 39.

In order to resolve or prevent this type of ejection failure, the maintenance section 45 performs cleaning of the nozzles N of the printing head 39. In the cleaning process, the maintenance section 45 forces liquid out of the printing head 39 into the cap 46. The maintenance section 45 includes a pump 49 communicating with the cap 46 through a tube path 51, such as a waste liquid tube. In the capping state where the cap 46 is in contact with the nozzle face 39A of the printing head 39, the nozzle face 39A and cap 46 form a closed space communicating with the nozzles N.

The maintenance section 45 drives the pump 49 in this capping state. Driving the pump 49 introduces negative pressure in the closed space between the nozzle face 39A of the printing head 39 and the cap 46, thus forcing liquid out of the nozzles N. Forcing liquid, such as ink, having a viscosity increased, containing air bubbles, or containing foreign matters, such as paper dust, out of the nozzles N prevents or resolves ejection failure of the nozzles N. During the cleaning process, the cap 46 is held in the capping state where the cap 46 is in contact with the nozzle face 39A of the printing head 39 through energizing force of a spring 52 (see FIG. 4).

The pump 49 is a suction pump communicating with the cap 46 in the example illustrated in FIG. 4 but may be a pressure pump that pressurizes liquid within a flow path communicating with the nozzles N of the printing head 39, from upstream. When the pump 49 is a pressure pump, the pump 49 is driven to pressurize liquid within the flow path communicating with the nozzles N from upstream to thereby force liquid out of the nozzles N. At this time, the cap 46 may be a little spaced from the nozzle face 39A.

Figure 5:
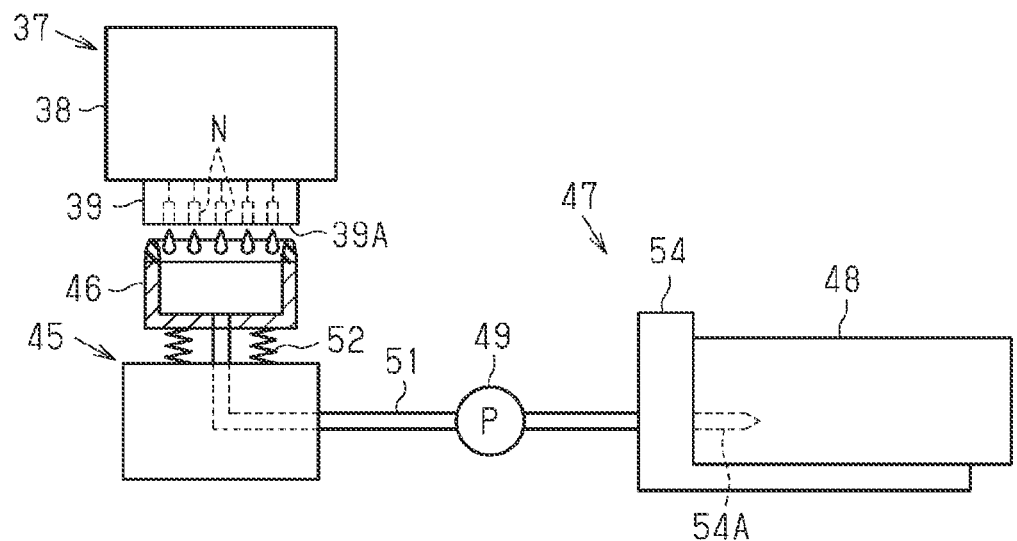
FIG. 5 is a schematic diagram illustrating the maintenance section and waste agent collecting section in the process of flushing.

As illustrated in FIG. 5, the printing section 37 moves to the home position HP regularly or irregularly during printing and performs idle ejection (also referred to as flushing) to cause droplets to be ejected from all the nozzles N toward the cap 46. Flushing prevents ejection failure during printing. The liquid (waste printing agent) discharged from the nozzles N into the cap 46 by cleaning and idle ejection is collected by the waste agent collecting section 47 and is accommodated by the waste agent accommodating section 48. The waste agent collecting section 47 includes the pump 49 and a part of the tube path 51 and drives the pump 49 to collect the waste agent (waste ink, for example) from the cap 46 through the tube path 51.

The waste agent collecting section 47 includes an attachment section 54 to which the waste agent accommodating section 48 is detachably attached. The attachment section 54 includes a needle-shaped joint 54A protruding from the attachment surface. The waste agent accommodating section 48 attached to the attachment section 54 is coupled to the joint 54A. The waste agent collected by the waste agent collecting section 47 is accommodated in the waste agent accommodating section 48 through the joint 54A. When detecting that the waste agent accommodating section 48 is filled with the waste agent, a controller 50 displays that information on the display section 35. When the user finds from the information displayed on the display section 35 that it is time to replace the waste agent accommodating section 48, the user removes the waste agent accommodating section 48 from the attachment section 54 within the printing apparatus 30 and mounts a new empty waste agent accommodating section 48 to the attachment section 54.

Electrical Configuration of Printing System 10

Next, the electrical configuration of the printing system 10 is described with reference to FIG. 6.

The printing apparatus 30 includes a communication section 26. In the example illustrated in FIG. 6, the printing apparatus 30 is coupled to the information terminal 20 through the communication section 26 so as to communicate with the information terminal 20. The remote worker instructs the printing apparatus 30 to perform printing from the information terminal 20. At this time, the printing data PD is transmitted from the information terminal 20 to the printing apparatus 30. The printing data PD include print image data including characters or images to be printed and printing condition information specified by the remote worker. The controller 50 within the printing apparatus 30 controls the printing section 37 and transporting section 40 based on the printing data PD received from the information terminal 20, to print characters, images, or the like based on the printing data PD on the medium M. The information terminal 20 is a host apparatus including a printing controller 23 controlling the printing apparatus 30. The information terminal 20 is a personal computer, a personal digital assistant (PDA), a tablet computer, a smartphone, or the like.

Figure 6:
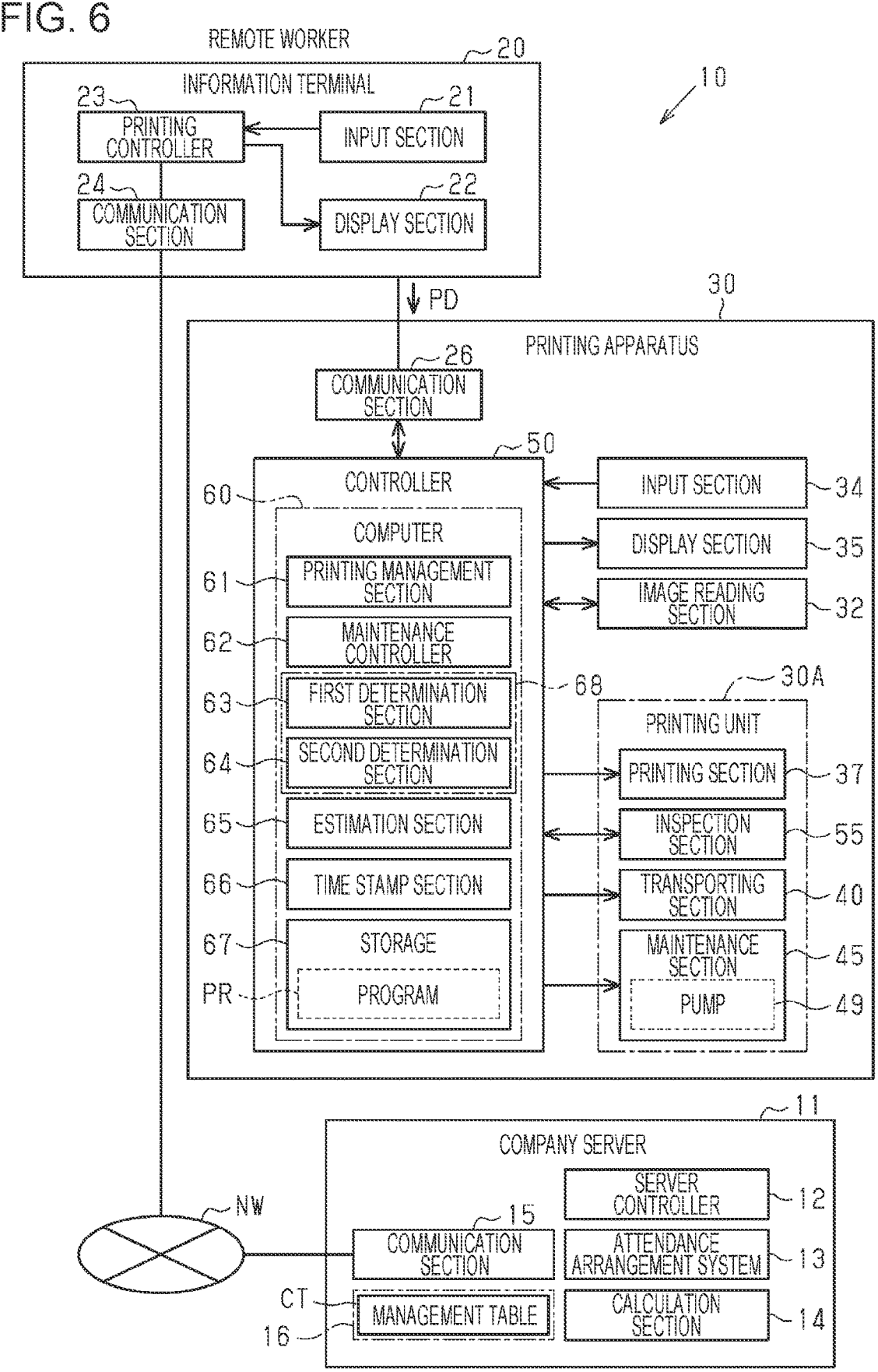
FIG. 6 is a block diagram illustrating an electric configuration of the printing system.

As illustrated in FIG. 6, the information terminal 20 of the remote worker includes an input section 21, a display section 22, the printing controller 23, and a communication section 24. The printing controller 23 comprehensively controls the information terminal 20. The printing controller 23 is coupled to the network NW through the communication section 24. The printing controller 23 is composed of a print driver, for example. The print driver is composed of software that is built within the information terminal 20 by a print driver program installed in the information terminal 20.

Electrical Configuration of Company Server 11

The company server 11 illustrated in FIG. 6 includes a server controller 12, an attendance management system 13, a calculation section 14, a communication section 15, and a storage 16. The server controller 12 comprehensively controls the company server 11. The server controller 12 is coupled to the network NW through the communication section 15. In the example illustrated in FIG. 6, the company server 11 is coupled to the information terminal 20 through the network NW so as to communicate with the information terminal 20. The company server 11 is able to communicate with the printing apparatus 30 through the information terminal 20 owned by the remote worker.

The attendance management system 13 manages attendance of the remote worker as the owner of the information terminal 20 authenticated by the server controller 12. The storage 16 stores a management table CT. The attendance management system 13 refers to the management table CT to determine whether it is within working hours or outside working hours.

The calculation section 14 calculates the cost depending on the amount of printing agent discarded as at least a part of the cost associated with business-use printing. The calculation section 14 calculates a printing cost depending on the number of prints determined by a determination section 68 to be for business use. The cost including the cost depending on the amount of printing agent discarded and the printing cost is the cost associated with business-use printing.

The calculation section 14 calculates the amount of payment including the cost depending on the number of prints in business-use printing and the cost depending on the amount of printing agent discarded by business-related maintenance each time the company server 11 receives information concerning business-use printing from the information terminal 20 or printing apparatus 30 or at each predetermined time. The cost may include a part of the cost necessary for the waste agent accommodating section 48 filled with the waste agent to be replaced with a new empty waste agent accommodating section 48, depending on the amount of printing agent discarded in business. In this case, the calculation section 14 calculates the portion of cost of the new waste agent accommodating section 48 by which the old waste agent accommodating section 48 filled with the waste agent is replaced, depending on the amount of waste agent discarded in business-use printing.

Electrical Configuration of Printing Apparatus 30

Next, the configuration of the printing apparatus 30 is described in detail.

The printing apparatus 30 includes the controller 50, the input section 34, the display section 35, the image reading section 32, and a printing unit 30A. The printing unit 30A includes the printing section 37, an inspection section 55, the transporting section 40, and the maintenance section 45. The maintenance section 45 includes the pump 49.

The user operates the input section 34 to select one of printing, scanning, and copying. The printing apparatus 30 is thereby instructed to perform one of printing, scanning, and copying. When being instructed to perform printing or copying, the printing apparatus 30 prints on the medium M using the printing agent with the printing section 37. The printing apparatus 30 can be instructed to perform printing (including copying) through operation for the input section 34 of the printing apparatus 30.

The image reading section 32 is controlled by the controller 50 to read an original. When receiving an instruction to perform printing, the controller 50 causes the transporting section 40 to transport the medium M and causes the printing head 39 to eject ink as the printing agent to print characters, images, or the like on the medium M. When receiving an instruction to copy, for example, the controller 50 causes the image reading section 32 to read an original and causes the printing section 37 to print the image of the read original, thus printing a copy.

The maintenance section 45 is controlled by the controller 50. The controller 50 performs maintenance of the printing head 39 at a predetermined maintenance time. The maintenance includes flushing (idle ejection) to cause droplets to be ejected from all the nozzles N of the printing head 39 toward a predetermined place other than the medium M and cleaning to force liquid out of the nozzles N of the printing head 39. The pump 49 may be a suction pump communicating with the cap 46 or may be a pressure pump pressurizing from upstream, liquid within the flow path communicating with the nozzles N of the printing head 39.

The inspection section 55 inspects the printing section 37. To be specific, the inspection section 55 inspects the nozzles N of the printing section 37. The inspection section 55 causes ink as an example of the printing agent to be ejected from the nozzles N, for example, to inspect clogging of the nozzles N, sticking of foreign matters, such as paper dust, to the nozzles N, the presence of air bubbles in ink within the nozzles N, and the like. The inspection section 55 detects ejection failure, including clogging of the nozzles N, by analyzing attenuation of vibration occurring in driving elements (piezo elements, for example) when ink is ejected from the nozzles N. The inspection method by the inspection section 55 can be changed to any method. For example, the inspection section 55 may employ an inspection method of: applying a laser beam to the path of ink being ejected from the nozzles N; performing ejection drive causing ink to be ejected from the nozzles N; and when the laser beam is not blocked by the ink droplets, determining that the printing section 37 includes ejection failure. Alternatively, the inspection section 55 may employ an inspection method of: causing ink to be ejected from the nozzles N toward test paper; taking with camera, an image of a dot pattern formed by ink droplets landed on the test paper; and analyzing the image. When any dot is missing, the inspection section 55 determines that the printing section 37 includes ejection failure.

Upon accepting an instruction to perform printing, the controller 50 causes the inspection section 55 to inspect the printing section 37 before starting printing. When the result of inspection by the inspection section 55 indicates that printing failure is likely to occur, the controller 50 causes the maintenance section 45 to perform automatic cleaning of the printing section 37.

Configuration of Controller 50 of Printing Apparatus 30

The controller 50 includes a computer 60. The computer 60 is composed of a microprocessor, for example. The computer 60 includes a printing management section 61, a maintenance controller 62, a first determination section 63, a second determination section 64, an estimation section 65, a time stamp section 66, and a storage 67. The first and second determination sections 63 and 64 constitute the determination section 68. The storage 67 stores a program PR. The computer 60 executes the program PR to include the aforementioned printing management section 61, maintenance controller 62, first determination section 63, second determination section 64, estimation section 65, and time stamp section 66 as functional sections composed of software. At least one of the printing management section 61, maintenance controller 62, first determination section 63, second determination section 64, estimation section 65, and time stamp section 66 may be composed of hardware.

The controller 50 does not need to implement via software, all the processes designed to be executed by the controller 50 itself. For example, the controller 50 may include a dedicated hardware circuit (an application specific integrated circuit: ASIC, for example) that implements via hardware, at least some of the processes designed to be executed by the controller 50 itself. Specifically, the controller 50 can be configured as a circuitry including at least one processor operating according to a computer program (software), at least one dedicated hardware circuit executing at least some of the various processes, or a combination thereof. The processor includes a CPU and a memory, such as a RAM and a ROM, and the memory stores program codes or instructions configured to cause the CPU to execute the processes. The memory, that is, a computer-readable medium includes any available medium accessible by a general-purpose or a dedicated computer.

The printing management section 61 includes a counter. The counter counts the number of prints. The printing management section 61 causes the counter to count the number of prints of the printing apparatus 30. The count of the counter indicates the number of prints. The counter of the printing management section 61 of the embodiment counts the number of prints in at least business-use printing.

The printing management section 61 may include a plurality of counters configured to count the number of prints for each type of printing. The types of printing are Low and High, for example. Which of the two ranges printing falls in may be determined based on the printing condition information included in the printing data PD. For example, regular printing consumes a comparatively small amount of printing agent per sheet. On the other hand, photographic printing consumes a comparatively large amount of printing agent per sheet. For example, regular printing may be determined to fall in the range of Low while photographic printing is determined to fall in the range of High. The two ranges have a relationship of A<B where the unit cost of the Low range is A yen/sheet and the unit cost of the High range is B yen/sheet. The number of ranges is not limited to two and may be three or four. In such a manner, the printing management section 61 may count the number of prints for each unit cost per sheet. The printing management section 61 may be configured to count the number of prints in business-use printing of a single unit cost. At a predetermined time, the controller 50 transmits to the company server 11, the information on the number of prints in business-use printing counted with the counter of the printing management section 61.

The maintenance controller 62 performs control associated with maintenance. The maintenance controller 62 performs manual cleaning when receiving an instruction to perform manual cleaning based on the remote worker's operation for the input section 21 of the information terminal 20 or for the input section 34 of the printing apparatus 30. The instruction to perform manual cleaning is given by the user's operation for the input section 21 or 34.

The maintenance controller 62 causes the inspection section 55 to inspect the nozzles N of the printing section 37 prior to start of printing when accepting an instruction to perform printing from the information terminal 20 or an instruction to perform printing by an operation for the input section 34. The inspection section 55 inspects the nozzles N of the printing section 37. To be specific, the inspection section 55 inspects clogging of the nozzles N, sticking of foreign matters, such as paper dust, to the nozzles N, the presence of air bubbles in ink within the nozzles N, and the like. When the result of the nozzle inspection by the inspection section 55 indicates detection of a defective nozzle that is likely to fail to properly eject the printing agent, the maintenance controller 62 performs automatic cleaning. The automatic cleaning is cleaning automatically performed by the maintenance controller 62 when the controller 50 determines whether the operation conditions of cleaning are satisfied and the operation conditions of cleaning are satisfied. During printing, the maintenance controller 62 measures time and moves the printing section 37 to the home position HP at predetermined intervals of time for flushing (idle ejection) causing the printing agent (ink droplets) to be ejected toward the cap 46 from all the nozzles N.

When accepting an instruction to perform printing, the controller 50 causes the inspection section 55 to inspect the printing section 37 before starting printing. When the result of inspection by the inspection section 55 indicates that printing failure is likely to occur, the maintenance controller 62 causes the maintenance section 45 to perform automatic cleaning of the printing section 37.

The determination section 68 determines whether the waste agent is discarded in business-use printing or private-use printing. The determination section 68 determines whether maintenance is business-related maintenance to reduce printing failure in business-use printing or private-related maintenance to reduce printing failure in private-use printing. When printing resulting from an accepted instruction is business-use printing, the determination section 68 determines that the automatic cleaning is business-related cleaning accompanying business-use printing. The determination section 68 determines that printing resulting from an instruction accepted during working hours is business-use printing based on the attendance information managed by the attendance management system 13. The determination section 68 includes the first and second determination sections 63 and 64.

The first determination section 63 determines whether printing resulting from an accepted instruction is business-use printing or private-use printing. The first determination section 63 determines whether printing resulting from an instruction given from the information terminal 20 by the remote worker or printing resulting from an instruction given through operation for the input section 34 is business-use printing or private-use printing. As the method of informing the printing apparatus 30 that the printing resulting from an instruction is business-use printing, the embodiment employs at least one of four examples illustrated in FIGS. 9 to 12. The first determination section 63 determines whether printing resulting from an instruction given to the printing apparatus 30 is business-use printing or private-use printing through the method corresponding to any one of the four examples. The four examples are described in detail later.

The second determination section 64 determines that the maintenance having a relationship satisfying a setting condition with business-use printing is business-related maintenance. When the printing apparatus 30 accepts an instruction to perform business-use printing, the second determination section 64 determines whether cleaning is performed immediately before the business-use printing within a set time. When manual cleaning is performed immediately before the business-use printing within the set time, the second determination section 64 determines that the manual cleaning is business-related cleaning as cleaning accompanying business-use printing to prevent ejection failure during business-use printing. Business-related cleaning is one of business-related maintenance processes. Herein, the set time is a predetermined time in a range from one to ten minutes, for example. The set time may be different for each company. The set time may be outside of the range from one to ten minutes.

Furthermore, the second determination section 64 determines that automatic cleaning performed when the result of inspection performed by the inspection section 55 upon the printing apparatus 30 accepting an instruction to perform business-use printing indicates that ejection failure is likely to occur in the printing section 37 is business-related cleaning.

The second determination section 64 determines that flushing performed during business-use printing is business-related maintenance that is maintenance accompanying business-use printing. In the embodiment, the cost of the printing agent consumed by flushing as one of the business-related maintenance processes may be also paid by the company depending on the amount of printing agent discarded.

When the determination section 68 determines that the printing agent (waste agent) is discarded in business-use printing, the estimation section 65 estimates the amount of printing agent discarded in the business-use printing. The estimation section 65 estimates the amount of printing agent discarded by business-related maintenance. The estimation section 65 may estimate the amount of printing agent discarded in business-use printing based on the number of business-use prints printed by the printing apparatus 30.

The estimation section 65 may include a function of measuring the amount of printing agent consumed by maintenance. The estimation section 65 includes plural color counters that count for the respective colors of the printing agent, the amount of printing agent consumed from the printing section 37 by maintenance. The estimation section 65 stores in a predetermined memory area of the storage 67, a maintenance table indicating the correspondence relationship between the operation contents of maintenance and the amount of printing agent consumed. For example, cleaning includes plural types of cleaning different in strength, including first cleaning CL1 and second cleaning CL2. When cleaning includes n types of cleaning, for example, the n types of cleaning include the first cleaning CL1, . . . , and n-th cleaning CLn (n is a natural number not less than two). In this case, the cleaning strength of the cleaning CL1 is the lowest, followed in order by CL2 . . . , and CLn (CL1< . . . <CLn). The operation contents of cleaning are specified by the respective types of cleaning, the cleaning CL1, . . . , CLn that are different in cleaning strength. The greater the cleaning strength, the greater the amount of printing agent consumed (discarded) by cleaning like: CL1< . . . , <CLn.

When multiple instructions to perform manual cleaning are given within a predetermined time, the second cleaning is performed with higher strength than the first cleaning. For example, the first cleaning is the first cleaning CL1 while the second cleaning is the second cleaning CL2.

When the number of defective nozzles is smaller than a threshold as a result of nozzle inspection by the inspection section 55, the first cleaning CL1 is performed. When the number of defective nozzles is not smaller than the threshold, the second cleaning CL2, which is higher in strength than the first cleaning CL1, is performed.

The maintenance table includes the correspondence relationship between the n types of cleaning, the cleaning CL1, . . . , CLn, that specify the operation contents of cleaning and the amount of printing agent consumed by the n types of cleaning. Based on the operation contents of cleaning, the estimation section 65 acquires the amount of consumed printing agent corresponding to the operation contents of cleaning. When cleaning is performed, the estimation section 65 adds to the corresponding color counter, the amount of consumed printing agent that is acquired with reference to the maintenance table based on the operation contents of cleaning. The estimation section 65 also adds the amount of printing agent consumed by flushing during business-use printing to the corresponding color counter. In such a manner, the estimation section 65 counts the amount of printing agent consumed by business-related maintenance on a color-by-color basis with the color counters. The estimation section 65 thus estimates the cumulative amount of printing agent consumed by business-related maintenance within a predetermined time period. The predetermined time period refers to a time period from when information of the cumulative amount of printing agent consumed in business-related maintenance is previously transmitted to the company server 11 to when the information is transmitted next. The amount of printing agent discarded is counted on a color-by-color basis with the color counters in consideration of the situation where the cost of the printing agent depends on its color. When such a consideration is unnecessary, the amount of printing agent discarded does not need to be counted on a color-by-color basis.

The time stamp section 66 stores time stamp information including operation times of events, such as printing and maintenance, in the storage 67 for management in the printing apparatus 30. The time stamp information is information that associates the contents of events, including completed printing and maintenance, with the operation time thereof. The second determination section 64 of the embodiment uses the time stamp information to determine whether manual cleaning is business-related maintenance.

The controller 50 manages the number of prints in business-use printing and the amount of printing agent consumed (discarded) by business-related maintenance. At a predetermined time, the controller 50 transmits information concerning the number of prints of business-use printing and the amount of printing agent consumed (discarded) by business-related maintenance to the company server 11 directly or through the information terminal 20. The predetermined time is completion time of printing, power-on time, power-off time, completion time of cleaning, and time a certain time period elapsed, for example.

Management Table CT

Next, the management table CT is described with reference to FIG. 7. The management table CT illustrated in FIG. 7 is stored in the storage 16 of the company server 11. The management table CT is reference data specifying who bears the maintenance cost and whether to save the printing data PD. The controller 50 refers to the management table CT to manage ON and OFF to switch the maintenance cost bearer between the company and the remote worker and ON and OFF to switch whether to save a copy of the printing data PD depending on whether the maintenance is for business use or private use.

As illustrated in FIG. 7, the second determination section 64 sets the maintenance cost bearer to the company during working hours and to the remote worker outside working hours. In the printing process of the printing apparatus 30, the controller 50 copies the printing data PD to the company server 11 during working hours and does not copy nor save the printing data PD outside working hours.

Determination Using Attendance Management System 13

As illustrated in FIG. 8, the company server 11 determines based on the attendance management system 13 whether it is within working hours WP or outside-working hours OW, for example. When maintenance is performed, the cost bearer of the printing agent consumed in maintenance is switched between the company and the remote worker depending on whether the maintenance is performed during the working hours WP or outside-working hours OW. To be specific, when the maintenance is performed within the outside-working hours OW, the cost thereof is borne by the remote worker. When the maintenance is performed within the working hours WP, the cost thereof is borne by the company. In this embodiment, the printing apparatus 30 performs maintenance at the end of working hours at the company's expense. In other words, clogging of the nozzles N and the like due to printing during the working hours WP are resolved by maintenance performed at the end of working hours at the company's expense. Operation of the printing apparatus 30 is therefore handed off to the user who bears the cost of the printing agent during outside-working hours OW after clogging of the nozzles N is removed by maintenance.

Switch Between Private Use and Business Use of Printing Apparatus 30

Hereinafter, configuration examples of switch between private use and business use of the printing apparatus 30 is described. The configuration examples are four examples of first to fourth examples below. Hereinafter, the four examples are sequentially described. The first determination section 63 determines whether printing resulting from an instruction to the printing apparatus 30 is business-use printing (for business use) or private-use printing (for private use) by using at least one of the four configuration examples.

First Example

Figure 9:
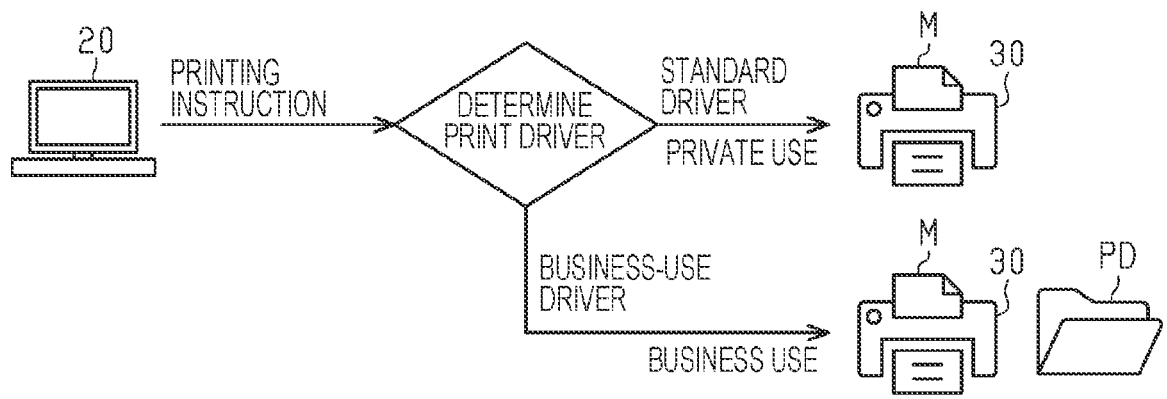
FIG. 9 is a schematic diagram illustrating a first example of determining whether printing is for private use or business use.

In the first example illustrated in FIG. 9, the information terminal 20 instructs the printing apparatus 30 to perform printing. The information terminal 20 includes as print drivers outputting the printing data PD to the printing apparatus 30, a first print driver as a business-use driver and a second print driver as a general-purpose standard driver. In the information terminal 20, the first and second print drivers are thus installed as the print drivers.

Upon accepting an instruction to perform printing from the information terminal 20, the determination section 68 (see FIG. 6) provided for the printing apparatus 30 determines the print driver having transmitted the instruction. When the print driver having transmitted the printing data PD received by the printing apparatus 30 is the first print driver as the business-use driver, the determination section 68 determines that the printing resulting from the accepted instruction is business-use printing. When the print driver having transmitted the printing data PD is the second print driver as the standard driver, the determination section 68 determines that the printing resulting from the accepted instruction is private-use printing. To be specific, the determination is performed by the first determination section 63 constituting the determination section 68. When the printing apparatus 30 performs business-use printing, the controller 50 copies the printing data PD to the company server 11.

Second Example

Figure 10:
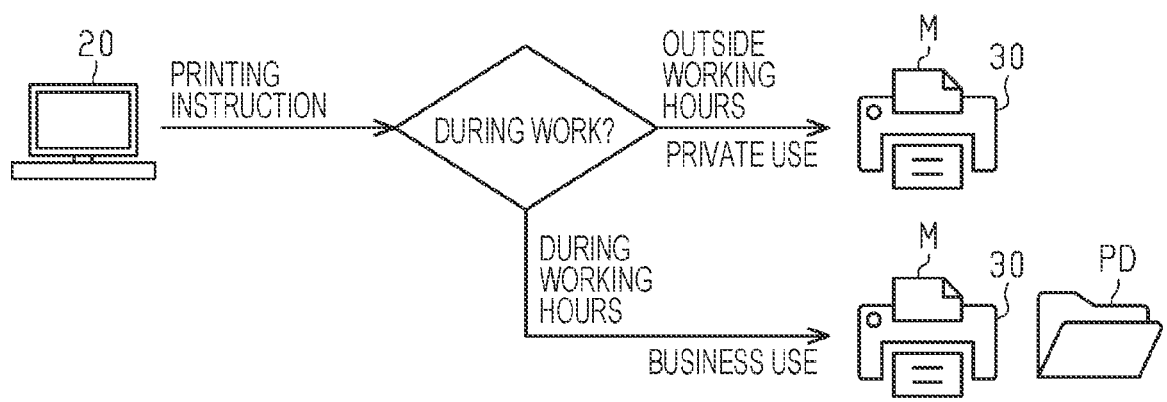
FIG. 10 is a schematic diagram illustrating a second example of determining whether printing is for private use or business use.

In the second example illustrated in FIG. 10, upon accepting an instruction to perform printing from the information terminal 20, the first determination section 63 determines whether the corresponding remote worker is working (it is within working hours of the remote worker). The first determination section 63 accesses the attendance management system 13 of the company server 11 and based on the attendance information of the remote worker, determines whether the remote worker is working. When it is outside working hours of the remote worker, the first determination section 63 determines that the accepted instruction to perform printing is an instruction to perform private-use printing. When it is within working hours of the remote worker, the first determination section 63 determines that the accepted instruction to perform printing is an instruction to perform business-use printing. When the printing apparatus 30 performs business-use printing, the controller 50 copies the printing data PD to the company server 11.

Third Example

Figure 11:
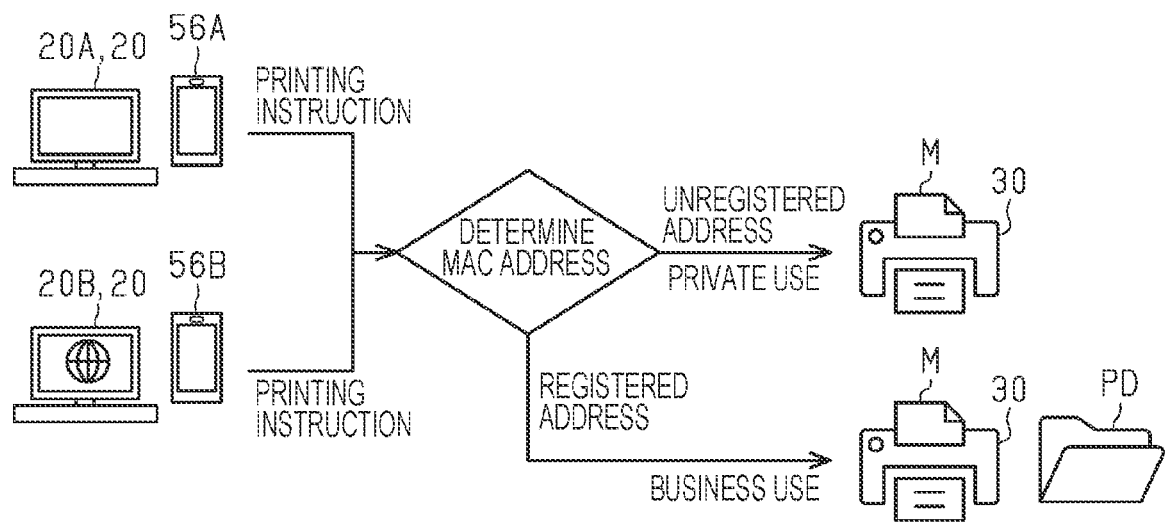
FIG. 11 is a schematic diagram illustrating a third example of determining whether printing is for private use or business use.

In the third example illustrated in FIG. 11, the remote worker properly uses a privately owned first information terminal 20A or a company's second information terminal 20B lent or supplied from the company in the second place, such as his/her home, depending on whether to perform private-use printing or business-use printing. The information terminal 20 instructing the printing apparatus 30 to perform printing is properly used as the first information terminal 20A giving an instruction to perform private-use printing and the second information terminal 20B giving an instruction to perform business-use printing.

The first determination section 63 determines whether printing resulting from the accepted instruction is business-use printing or private-use printing, based on unique information received by the printing apparatus 30 from the information terminal 20. The privately-owned first information terminal 20A and the company's second information terminal 20B have different MAC addresses as an example of the unique information. When accepting an instruction to perform printing from one of the information terminals 20A and 20B, the first determination section 63 determines the MAC address from the accepted instruction. When the MAC address is an unregistered address, the first determination section 63 determines that the accepted instruction to perform printing is an instruction to perform private-use printing. The printing apparatus 30 performs private-use printing on the medium M. When the MAC address is a registered address, the first determination section 63 determines that the accepted instruction to perform printing is an instruction to perform business-use printing. The printing apparatus 30 performs business-use printing on the medium M. When the printing apparatus 30 performs business-use printing, the controller 50 copies the printing data PD to the company server 11.

As the information terminal 20, the information terminals 20A and 20B, such as personal computers, are properly used by the remote worker, but portable information terminals 56A and 56B, such as smartphones, may be employed in addition to or instead of at least one of the information terminals 20A and 20B. When accepting an instruction to perform printing from the portable information terminal 56A privately owned or the portable information terminal 56B of the company, the first determination section 63 determines based on the determination result of the MAC address whether the printing resulting from the accepted instruction is private-use printing or business-use printing. The unique information is not limited to MAC addresses and may be any information uniquely specified. For example, the unique information may be a product identification number or remote worker's identification number.

Fourth Example

Figure 12:
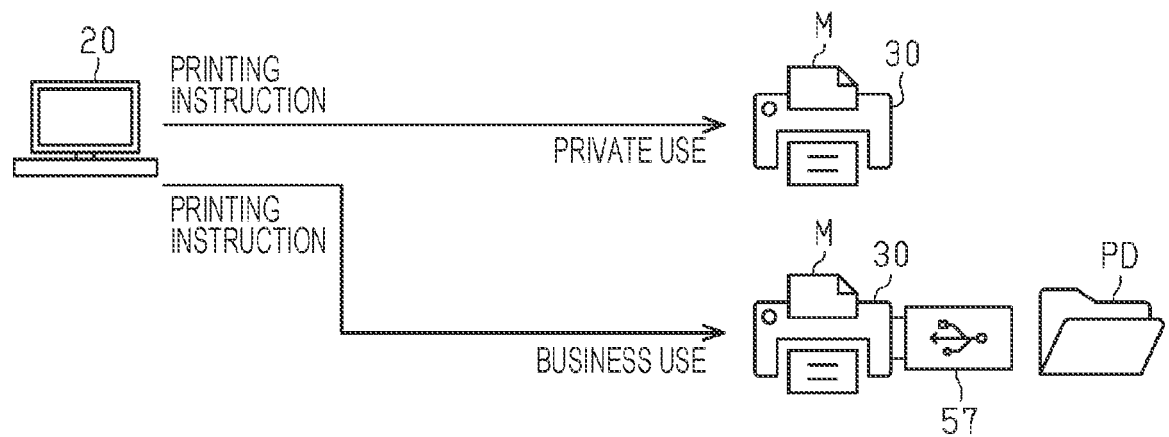
FIG. 12 is a schematic diagram illustrating a fourth example of determining whether printing is for private use or business use.

In the fourth example illustrated in FIG. 12, the remote worker couples a USB memory 57 taken home from the company, to the printing apparatus 30 for business-use printing using the printing apparatus 30. This USB memory 57 stores a code permitting business-use printing. When the remote worker instructs the printing apparatus 30 to perform printing from the information terminal 20 without coupling the USB memory 57 to the printing apparatus 30, the first determination section 63 cannot read any code and determines that the instruction to perform printing is an instruction to perform private-use printing. The printing apparatus 30 performs private-use printing on the medium M. In order to perform business-use printing, the remote worker couples the USB memory 57 to the printing apparatus 30 and then instructs the printing apparatus 30 to perform printing from the information terminal 20. When accepting the instruction to perform printing from the information terminal 20, the first determination section 63 determines that the instruction to perform printing is an instruction to perform business-use printing since the code read from the USB memory 57 permits business-use printing. The printing apparatus 30 performs business-use printing on the medium M. When the printing apparatus 30 performs business-use printing, the controller 50 copies the printing data PD to the company server 11.

In the first to fourth examples described above, when the first determination section 63 determines that the accepted instruction to perform printing is an instruction to perform business-use printing, the second determination section 64 determines whether maintenance having a relationship satisfying the setting condition with the business-use printing is performed. When maintenance having a relationship satisfying the setting condition with the business-use printing is performed, the second determination section 64 sets the maintenance as business-related maintenance.

Operation of Embodiment

Next, the operation of the printing system 10 of the embodiment is described with reference to FIG. 13.

In the example illustrated in FIG. 13, the remote worker performs printing on the medium M by instructing the printing apparatus 30 to perform printing from the information terminal 20. The remote worker uses his/her own printing apparatus 30 to perform business-use printing and private-use printing. The remote worker sometimes performs business-use printing during working hours, for example. In some cases, the remote worker instructs the printing apparatus 30 to perform manual cleaning when determining that cleaning is necessary. The example illustrated in FIG. 13 does not include an example of giving an instruction to perform private-use printing. Private-use printing is the same as business-use printing in terms of the printing operation of the printing apparatus 30 itself and the operation of maintenance accompanying the printing operation although the cost thereof is not borne by the company.

In the following description, manual cleaning is business-related cleaning, automatic cleaning is business-related cleaning, and business-use printing is performed.

The remote worker gives an instruction to perform manual cleaning from the information terminal 20 (step S31). The remote worker gives an instruction to perform business-use printing from the information terminal 20 (step S32). The remote worker also can give an instruction to perform manual cleaning through operation for the input section 34 of the printing apparatus 30.

In step S11, the controller 50 determines whether the instruction to perform manual cleaning is received. When the instruction to perform manual cleaning is received, the controller 50 goes to step S12, and when the instruction to perform manual cleaning is not received, the controller 50 goes to step S14.

In step S12, the controller 50 performs manual cleaning. The controller 50 moves the carriage 38 to the maintenance position (the home position HP, for example) while elevating the cap 46 into contact with the nozzle face 39A to form a closed space communicating with the nozzles N between the nozzle face 39A and the cap 46 as illustrated in FIG. 4. In this situation, the controller 50 drives the pump 49, for example, to depressurize the closed space communicating with the nozzles N, thus forcing the printing agent (ink, for example) out of the nozzles N. When the pump 49 is a pressure pump, pressure cleaning may be performed that drives the pressure pump to pressurize the printing agent (ink, for example) within the printing agent accommodating section 42, thus forcing the printing agent out of the nozzles N.

In step S13, the controller 50 stores in the storage 67, information on the operation time of cleaning, the operation contents of cleaning, and the amount of printing agent discarded by cleaning. The operation time is acquired from the time stamp by the time stamp section 66. As the operation contents of cleaning, the controller 50 stores information, including the cleaning CL1, CL2, . . . , that specify the respective types depending on the cleaning strength, for example. As the amount of printing agent discarded by cleaning, the controller 50 stores a value acquired by using a printing agent consumption measuring function provided for the estimation section 65, that is, by referring to the maintenance table based on the operation contents (the type, for example) of cleaning, for example.

In step S32, the remote worker gives an instruction to perform business-use printing from the information terminal 20. The printing controller 23 of the information terminal 20 instructs the printing apparatus 30 to perform business-use printing. At this time, the remote worker gives an instruction to perform business-use printing by at least one of the methods of the first to fourth examples illustrated in FIGS. 9 to 12.

In step S14, the controller 50 determines whether an instruction to perform printing is received. When any instruction to perform printing is not received, the controller 50 returns to the process in step S11, and when an instruction to perform printing is received, the controller 50 goes to step S15.

In step S15, the controller 50 determines whether the printing resulting from the received instruction is business-use printing. To be specific, the controller 50 determines whether the printing is business-use printing or private-use printing by using any of the methods of the first to fourth examples illustrated in FIGS. 9 to 12. When the printing is business-use printing, the controller 50 goes to step S16, and when the printing is not business-use printing, that is, when the printing is private-use printing, the controller 50 goes to step S18.

In step S16, the controller 50 determines whether any cleaning is performed immediately before within the set time. When cleaning is performed immediately before within the set time, the controller 50 goes to step S17, and when cleaning is not performed immediately before within the set time, the controller 50 goes to step S18. The set time is a predetermined amount in a range from one to ten minutes, for example. The controller 50 determines whether any cleaning is performed immediately before reception of the instruction to perform printing within the set time by using the time stamp information concerning the operation time stored in the storage 67 in step S13. In this process, the target cleaning determined to be performed is manual cleaning. In other words, in the determination process in step S16, the controller 50 determines whether manual cleaning corresponding to business-related cleaning that is cleaning accompanying business-use printing resulting from the current instruction is performed. Manual cleaning not satisfying this condition is not considered as business-related cleaning.

In step S17, the controller 50 sets the cleaning as business-related cleaning. To be specific, when manual cleaning was performed immediately before reception of the instruction to perform printing within the set time, the controller 50 sets the manual cleaning as business-related cleaning, which is cleaning that discards the printing agent in business-use printing.

In step S18, the controller 50 performs nozzle inspection of the printing section 37. The controller 50 causes the inspection section 55 to inspect the nozzles N of the printing section 37 for detecting the presence of nozzle failure.

In step S19, the controller 50 determines whether the printing section 37 includes nozzle failure. When the printing section 37 includes nozzle failure, the controller 50 goes to step S20, and when the printing section 37 does not include any nozzle failure, the controller 50 goes to step S22. The controller 50 may determine that the printing section 37 includes nozzle failure when even one of all the nozzles N of the printing head 39 fails in ejection or may determine that the printing section 37 includes nozzle failure when the number of nozzles N failing in ejection exceeds a threshold number previously set.

In step S20, the controller 50 performs automatic cleaning, that is, the controller 50 performs the same cleaning as that in step S12. To be specific, as illustrated in FIG. 4, the controller 50 moves the carriage 38 to the maintenance position while elevating the cap 46 into contact with the nozzle face 39A to form a closed space communicating with the nozzles N between the nozzle face 39A and the cap 46. In this situation, the controller 50 drives the pump 49, for example, to depressurize the closed space communicating with the nozzles N, thus forcing the printing agent (ink, for example) out of the nozzles N. Cleaning may be pressure cleaning.

In step S21, the controller 50 stores in the storage 67, information on the operation contents of the business-related cleaning and the amount of printing agent discarded by the business-related printing. As the operation contents, the controller 50 stores information, including the cleaning CL1, CL2, . . . that specify the respective types different in cleaning strength, for example. As the amount of printing agent discarded, the controller 50 stores a value that is acquired with reference to the maintenance table based on the operation contents (type) of cleaning, for example, by using the printing agent consumption measuring function provided for the estimation section 65.

In step S22, the controller 50 performs business-use printing. To be specific, the controller 50 uses at least one of the methods of the first to fourth examples to execute the printing as business-use printing resulting from the current instruction. In business-use printing, which is the same as private-use printing in printing operation itself, the printing section 37 ejects ink as an example of the printing agent, onto the medium M transported by the transporting section 40 to print characters, images, or the like based on the printing data PD on the medium M. During printing, flushing (idle ejection) to cause the printing agent to be ejected from the nozzles N of the printing section 37 is performed regularly or irregularly. When the printing is business-use printing, the controller 50 determines that flushing is business-related maintenance. The estimation section 65 estimates the amount of printing agent consumed (discarded) by flushing based on the number of ejections or with reference to the maintenance table and stores the estimated amount of printing agent in the storage 67. In the embodiment, as described above, the amount of printing agent consumed (discarded) by flushing during business-use printing is also included in the amount of printing agent consumed by business-related maintenance.

In step S23, the controller 50 transmits to the company server 11, information on the number of prints for business use and the amount of printing agent discarded for business use. The information on the number of prints for business use (the number of business-use prints) and the amount of printing agent discarded for business use is transmitted to the company server 11 via the information terminal 20 through the network NW. In this embodiment, the information on the amount of printing agent discarded for business use includes the amount of printing agent discarded by flushing. The information on the number of prints for business use and the information on the amount of printing agent discarded for business use may be simultaneously transmitted together to the company server 11 or individually transmitted to the company server 11. In the latter case, the time to transmit the information on the number of prints for business use to the company server 11 and the time to transmit the information on the amount of printing agent discarded for business use to the company server 11 may be individually set.

In step S41, the company server 11 determines whether the information is received. When the information is received, the company server 11 goes to step S42, and when the information is not received, the company server 11 goes to step S43.

In step S42, the company server 11 calculates and adds the amount of payment based on the received information. To be specific, the calculation section 14 of the company server 11 calculates the amount of payment based on the information and adds the calculated amount of payment to the cumulative amount of payment stored in the memory. The calculation section 14 may individually manage a first payment relating to the number of business-use prints and a second payment relating to business-related maintenance and separately manages the cumulative amounts of payment thereof.

In step S43, the company server 11 determines whether it is the payment time. When it is the payment time, the company server 11 goes to step S44 and when it is not the payment time, the company server 11 returns to step S41. The payment time is set to the payday or a day previously specified per month, per several months, or per year, for example. The time of the first payment relating to the number of business-use prints and the time of the second payment relating to business-related maintenance may be different from each other, for example.

In step S44, the company server 11 performs a payment process. In the embodiment, the company server 11 performs a process of paying the current cumulative amount of payment to an employee as the remote worker. As the current cumulative amount of payment, the cumulative amounts of the first and second payments may be individually paid. A not-illustrated bookkeeping system other than the company server may be used to perform the payment process based on the information on the cumulative amount of payment from the company server 11.

The printing apparatus 30 is located in the second place, such as the remote worker's home, and is sometimes privately used to perform private-use printing by the remote worker. In such a case, the remote worker gives an instruction to perform private-use printing by at least one of the methods of the first to fourth examples illustrated in FIGS. 9 to 12. In step S15 in FIG. 13, the controller 50 therefore determines that the printing resulting from the received instruction is private-use printing. The controller 50 then goes to step S18. In other words, any cleaning is not set as business-related cleaning.

In private-use printing, the processes of nozzle inspection (step S18), nozzle failure determination (step S19), and automatic cleaning (step S20) are performed in the same manner as those in business-use printing. However, since cleaning during private-use printing is not business-related cleaning, the process of step S21 is not performed, and in step S22, private-use printing is performed instead of business-use printing. At private-use printing, the company is not supposed to pay for the number of prints and the amount of printing agent consumed by maintenance, and the process in step S23 is not performed.

Hereinafter, the effects of the embodiment are described.

(1) The printing system 10 includes: the company server 11 provided in the first place; and the printing apparatus 30 that is provided in the second place and is used in business-use printing and private-use printing. The printing apparatus 30 includes: the printing section 37 using the printing agent to print on a medium; and the waste agent collecting section 47 collecting as the waste agent, the portion of the printing agent that is consumed by the printing section 37 but is discarded without being used in printing on the medium. The printing system 10 includes the determination section 68 and the estimation section 65. The determination section 68 determines whether the printing agent as the waste agent is discarded in business-use printing or private-use printing. The estimation section 65 estimates the amount of printing agent determined by the determination section 68 to be discarded in business-use printing. According to this configuration, in some cases, the remote worker performs business-use printing by using the printing apparatus 30 privately owned, for example. As at least a part of the cost of business-use printing, the owner of the company or the like is thereby able to pay to an employee, the cost depending on the amount of printing agent discarded in business-use printing.

(2) The printing apparatus 30 includes the maintenance section 45 performing maintenance of the printing section 37. The amount of printing agent discarded is an amount of printing agent discarded from the printing section 37 by maintenance. The determination section 68 determines whether the maintenance is business-related maintenance to reduce printing failure at business-use printing or private-related maintenance to reduce printing failure at private-use printing. The estimation section 65 estimates the amount of printing agent discarded by business-related maintenance. According to this configuration, it is possible to estimate the amount of printing agent consumed (discarded) from the printing section 37 by business-related maintenance. For example, it is possible to calculate the cost depending on the amount of printing agent consumed by business-related maintenance. For example, the company or the like is able to bear the cost of maintenance for the employee as the owner of the printing apparatus 30.

(3) The maintenance is cleaning of the printing section 37. According to this configuration, it is possible to pay to the remote worker or the like, the cost of the printing agent consumed by business-related cleaning as cleaning accompanying business-use printing.

(4) The determination section 68 includes: the first determination section 63 determining whether the printing resulting from the accepted instruction is business-use printing or private-use printing; and the second determination section 64 determining that cleaning having a relationship satisfying the setting condition with business-use printing is business-related cleaning accompanying business-use printing. According to this configuration, it is possible to identify the maintenance having a relationship satisfying the setting condition with business-use printing as business-related cleaning.

(5) The printing apparatus 30 includes: the controller 50 controlling the maintenance section 45; and the inspection section 55 inspecting the printing section 37. Upon accepting an instruction to perform printing, the controller 50 causes the inspection section 55 to inspect the printing section 37 before starting printing.

Furthermore, when the result of inspection indicates that printing failure is likely to occur, the controller 50 causes the maintenance section 45 to perform automatic cleaning of the printing section 37. When the printing resulting from the accepted instruction is business-use printing, the determination section 68 determines that the automatic cleaning is business-related cleaning accompanying business-use printing. According to this configuration, it is possible to pay the cost of the printing agent consumed by automatic cleaning.

(6) The printing system 10 further includes the information terminal 20 instructing the printing apparatus 30 to perform printing. The information terminal 20 includes the business-dedicated first print driver and the general-use second print driver as a print driver outputting printing data to the printing apparatus 30. The determination section 68 is provided for the printing apparatus 30, and when the print driver having transmitted the printing data received by the printing apparatus 30 is the first print driver, the determination section 68 determines that the printing resulting from the instruction is business-use printing. When the print driver having transmitted the printing data received by the printing apparatus 30 is the second print driver, the determination section 68 determines that the printing resulting from the instruction is private-use printing. According to this configuration, it is possible to determine whether the printing is business-use printing or private-use printing depending on whether the print driver having transmitted the printing data received by the printing apparatus 30 is the first or second print driver.

(7) The company server 11 includes the attendance management system 13 managing whether it is within working hours or outside working hours. When an instruction to perform printing is given during working hours, the determination section 68 determines that the printing resulting from the instruction is business-use printing based on the attendance information managed by the attendance management system 13. According to this configuration, it is possible to determine that the printing resulting from the instruction given during working hours is business-use printing, by using the attendance information managed by the attendance management system 13.

(8) The printing system 10 includes the information terminal 20 giving an instruction to perform printing to the printing apparatus 30. The information terminal 20 is properly used as the first information terminal 20A giving an instruction to perform private-use printing and the second information terminal 20B giving an instruction to perform business-use printing depending on whether to perform private-use printing and business-use printing. The determination section 68 determines based on unique information received by the printing apparatus 30 from the information terminal 20 whether the printing resulting from the given instruction is business-use printing or private-use printing. According to this configuration, it is possible to determine based on unique information received by the printing apparatus 30 from the information terminal 20 whether the printing resulting from the instruction is business-use printing or private-use printing.

(9) The printing system 10 further includes the calculation section 14 calculating the cost depending on the amount of printing agent discarded, as at least a part of the cost associated with business-use printing. According to this configuration, the owner of the company or the like is able to pay to the remote worker, the cost depending on the amount of printing agent discarded in business-use printing as at least a part of the cost associated with business-use printing.

(10) The calculation section 14 calculates the printing cost depending on the number of prints in business-use printing and the printing agent cost depending on the amount of printing agent discarded. According to this configuration, as the cost associated with business-use printing, it is possible to pay the printing agent cost depending on the amount of printing agent discarded, in addition to the cost depending on the number of prints.

(11) The waste agent collecting section 47 includes the replaceable waste agent accommodating section 48 accommodating the waste agent collected. The cost calculated by the calculation section 14 includes a part of the cost of the new waste agent accommodating section 48 by which the old waste agent accommodating section 48 filled with the waste agent is replaced, depending on the amount of waste agent discarded in business-use printing. According to this configuration, it is possible to pay to the remote worker or the like, the portion of the cost required to replace the waste agent accommodating section 48 that depends on the amount of waste agent discarded in business.

(12) The first place is the company, and the second place is the home of the employee who owns the printing apparatus 30. According to this configuration, when the employee, such as a remote worker working at his/her home, performs business-use printing by using the printing apparatus 30 privately-owned, it is possible to pay to the employee, the cost depending on the amount of printing agent discarded in business-use printing.

(13) The printing apparatus 30 is used in business-use printing and private-use printing. The printing apparatus 30 includes the printing section 37, waste agent collecting section 47, determination section 68, and estimation section 65. The printing section 37 prints on a medium using the printing agent supplied from the printing agent accommodating section 42 accommodating the printing agent. The waste agent collecting section 47 collects as the waste agent, the portion of the printing agent that is consumed by the printing section 37 but is discarded without being used in printing on a medium. The determination section 68 determines whether the printing agent as the waste agent is discarded in business-use printing or private-use printing. The estimation section 65 estimates the amount of printing agent determined by the determination section 68 to be discarded in business-use printing. According to this configuration, when the remote worker performs business-use printing by using the printing apparatus 30, the owner of the company or the like is able to pay to the remote worker, the cost depending on the amount of printing agent discarded in business-use printing, as at least a part of the cost of business-use printing.

The aforementioned embodiment can be changed to modes like modifications illustrated below. Furthermore, the aforementioned embodiment and the following modifications can be properly combined as other modifications, and the following modifications can be properly combined as other modifications.

The estimation section 65 may estimate the amount of printing agent discarded in business-use printing based on the number of business-use prints printed by the printing apparatus 30. When the determination section 68 (to be specific, the first determination section 63) determines that the printing resulting from the accepted instruction is business-use printing, the estimation section 65 estimates the amount of printing agent consumed by business-related maintenance depending on the number of prints in business-use printing. The larger the number of prints, the larger the amount of printing agent that tends to be consumed by maintenance including cleaning and flushing. The controller 50 stores in the storage 67, a reference table indicating the correspondence relationship between the number of prints and the amount of printing agent discarded, for example. The estimation section 65 acquires the amount of printing agent discarded by business-related maintenance with reference to the reference table based on the number of prints in business-use printing. According to this configuration, the amount of printing agent discarded is estimated based on the number of business-use prints. It is therefore possible to properly acquire the amount of printing agent discarded, depending on the number of prints in business-use printing. For example, within the amount of printing agent discarded without being used in printing on a medium, the cost depending on the portion of the printing agent discarded in business-use printing can be paid to the remote worker.

In the embodiment, the printing apparatus 30 may transmit all the information concerning printing and maintenance, that is, information including the operation time and operation contents, to the company server 11 directly or via the information terminal 20. The company server 11 may acquire the number of prints in business-use printing and the amount of printing agent discarded by business-related maintenance based on the information received from the printing apparatus 30 or information terminal 20. In this configuration, the company server 11 includes the determination section 68 (the first and second determination sections 63 and 64) and the estimation section 65.

In the embodiment, the printing apparatus 30 may transmit to the information terminal 20, all the information concerning printing and maintenance, that is, information including the operation time and operation contents. The information terminal 20 may acquire the number of prints in business-use printing and the amount of printing agent discarded by business-related maintenance based on the information received from the printing apparatus 30. The information terminal 20 transmits to the company server 11, the number of prints in business-use printing and the amount of printing agent discarded by business-related maintenance. In this configuration, the information terminal 20 includes the determination section 68 (the first and second determination sections 63 and 64) and the estimation section 65.

In the aforementioned embodiment, the first and second determination sections 63 and 64 may be separately provided for two apparatuses from the apparatuses constituting the printing system 10. For example, the first determination section 63 may be provided for the printing apparatus 30 while the second determination section 64 is provided for the company server 11. Conversely, the first determination section 63 may be provided for the company server 11 while the second determination section 64 is provided for the printing apparatus 30. Alternatively, for example, the first determination section 63 may be provided for the printing apparatus 30 while the second determination section 64 is provided for the information terminal 20. Conversely, the first determination section 63 may be provided for the information terminal 20 while the second determination section 64 is provided for the printing apparatus 30. Furthermore, for example, the first determination section 63 may be provided for the information terminal 20 while the second determination section 64 is provided for the company server 11. Conversely, the first determination section 63 may be provided for the company server 11 while the second determination section 64 is provided for the information terminal 20.

In the printing apparatus 30 configured to perform timer cleaning, within the amount of printing agent consumed (discarded) by timer cleaning, the portion of the printing agent discarded in business-use printing may be added as the amount of printing agent consumed by maintenance for business use. The timer cleaning refers to cleaning performed when the elapsed time from operation of previous cleaning reaches a predetermined time. When the elapsed time reaches the predetermined time while the printing apparatus 30 is off, cleaning is performed the next time the printing apparatus 30 is powered on. For example, the amount of printing agent consumed by business-related maintenance may be calculated as a value of the amount of printing agent consumed by timer cleaning, multiplied by the ratio of the number of business-use prints to the total number of prints printed until the elapsed time reaches the predetermined time.

In the printing apparatus 30 performing print volume cleaning, within the amount of printing agent consumed (discarded) by print volume cleaning, the portion of the printing agent associated with business-use printing may be added as the amount of printing agent by maintenance for business use. The print volume cleaning refers to cleaning performed when the number of prints counted since operation of previous cleaning reaches a predetermined number. For example, the amount of printing agent consumed by business-related maintenance may be calculated as a value of the amount of printing agent consumed by print volume cleaning, multiplied by the ratio of the number of prints in business-use printing to the predetermined number.

The printing agent may be toner, for example. In other words, the printing apparatus 30 is not limited to an ink jet printer and may be a laser printer. In the printing apparatus 30 of this type as a laser printer, the waste agent collecting section 47 collects waste toner discarded without being used in printing on the medium M from the toner supplied to the laser-type printing section 37, and the collected waste toner is accommodated in the waste agent accommodating section 48. In this case, the determination section 68 included in the controller 50 determines whether the waste toner discarded is consumed in business-use printing or consumed in private-use printing. The controller 50 may transmit to the company server 11, the amount of waste toner, as the waste agent, discarded in business-use printing. Alternatively, the controller 50 may transmit to the company server 11, printing agent discarding information that can determine the amount of waste toner discarded, and the company server 11 may identify the amount of waste toner discarded in business based on the printing agent discarding information.

The controller 50 transmits to the company server 11, the amount of waste printing agent, such as ink, consumed by business-use printing. Instead, the controller 50 may transmit to the company server 11, the printing agent discarding information that can determine the amount of printing agent discarded. The printing agent discarding information may be information on the contents of maintenance (maintenance strength, for example), the number of times of maintenance, and the like, for example.

In the embodiment, business-use printing is evaluated by the number of prints while the amount of printing agent consumed by maintenance is evaluated by the volume or weight of the printing agent. However, business-use printing and the amount of printing agent consumed by maintenance may be evaluated by the same unit. Business-use printing may be evaluated by the amount of printing agent consumed by business-use printing instead of the number of prints. In this case, the amount of printing agent consumed by business-use printing may be calculated by calculating the amount of printing agent consumed per business-use print and multiplying the amount of printing agent consumed per business-use print by the number of prints.

The amount of printing agent consumed by business-related maintenance may include the amount of printing agent consumed by flushing (idle ejection) or need not include the same.

The medium M is not limited to a sheet of paper and may be a synthetic resin film or sheet, fabric, non-woven fabric, a composite film (a laminate sheet) of synthetic resin and metal, metal foil, a ceramic sheet, or the like.

The printing apparatus 30 is not limited to a serial printer and may be a line printer or a page printer.

Hereinafter, the technical ideas understood from the embodiment and modifications are described with the effects.

(A) A printing system is a printing system including: a server provided in a first place; and a printing apparatus that is provided in a second place and is used in business-use printing and private-use printing, in which the printing apparatus includes: a printing section performing printing on a medium using a printing agent; a waste agent collecting section collecting as a waste agent, a portion of the printing agent that is consumed by the printing section but is discarded without being used in printing on the medium; a determination section determining whether the printing agent as the waste agent is discarded in the business-use printing or the private-use printing; and an estimation section estimating the amount of printing agent determined by the determination section to be discarded in the business-use printing.

According to this configuration, the remote worker sometimes performs business-use printing by using a privately owned printing apparatus, for example. The owner of the company or the like is able to pay to the employee, the cost depending on the amount of printing agent discarded in business-use printing as at least a part of the cost of business-use printing.

(B) In the aforementioned printing system, the printing apparatus may include a maintenance section performing maintenance of the printing section, the amount of printing agent determined to be discarded in the business-use printing may be an amount of printing agent discarded from the printing section by maintenance, the determination section may determine whether the maintenance is business-related maintenance to reduce printing failure at the business-use printing or private-related maintenance to reduce printing failure at the private-use printing, and the estimation section may estimate the amount of printing agent discarded by the business-related maintenance.

According to this configuration, it is possible to estimate the amount of printing agent consumed (discarded) from the printing section by business-related maintenance. For example, it is possible to calculate the cost depending on the amount of printing agent consumed by business-related maintenance. For example, the company or the like is able to bear the cost of maintenance for the employee as the owner of the printing apparatus.

(C) In the aforementioned printing system, the estimation section may estimate, based on the number of business-use prints printed by the printing apparatus, the amount of printing agent determined to be discarded in the business-use printing.

According to this configuration, the amount of printing agent discarded is estimated based on the number of business-use prints. It is therefore possible to properly acquire the amount of printing agent depending on the number of business-use prints. For example, within the amount of printing agent discarded without being used in printing on a medium, the cost depending on the portion of the printing agent discarded in business-use printing can be paid to the remote worker.

(D) In the aforementioned printing system, the maintenance may be cleaning of the printing section or flushing preventing ejection failure during printing. According to this configuration, it is possible to pay to the remote worker or the like, the cost of the printing agent consumed by business-related cleaning that is cleaning accompanying business-use printing.

(E) In the aforementioned printing system, the determination section may include: a first determination section determining whether printing resulting from an accepted instruction is the business-use printing or the private-use printing; and a second determination section determining that the cleaning is business-related cleaning accompanying the business-use printing when the cleaning has a relationship satisfying a setting condition with the business-use printing.

According to this configuration, it is possible to determine the maintenance having a relationship that satisfies the setting condition with business-use printing to be business-related maintenance.

(F) In the aforementioned printing system, the printing apparatus may include: a controller controlling the maintenance section; and an inspection section inspecting the printing section, upon accepting an instruction to perform printing, the controller may cause the inspection section to perform inspection of the printing section before starting the printing, when the result of inspection indicates that printing failure is likely to occur, the controller may cause the maintenance section to perform automatic cleaning of the printing section, and when the printing resulting from the accepted instruction is the business-use printing, the determination section may determine that the automatic cleaning is business-related cleaning accompanying the business-use printing.

According to this configuration, it is possible to pay the cost of the printing agent consumed by automatic cleaning.

(G) In the aforementioned printing system, the printing system may further include an information terminal giving an instruction to perform printing to the printing apparatus, in which the information terminal may include as a print driver outputting printing data to the printing apparatus, a first print driver dedicated to business and a second print driver for general purpose, the determination section may be provided for the printing apparatus, and the determination section may determine that the printing resulting from the given instruction is the business-use printing when the print driver that outputted the printing data received by the printing apparatus is the first print driver and may determine that the printing resulting from the given instruction is the private-use printing when the print driver that outputted the printing data received by the printing apparatus is the second print driver.

According to this configuration, it is possible to determine whether the printing is business-use printing or private-use printing depending on whether the print driver that outputted printing data received by the printing apparatus is the first print driver or the second print driver.

(H) In the aforementioned printing system, the server may include an attendance management system managing whether it is within working hours or outside working hours, and the determination section may determine based on attendance information managed by the attendance management system, that printing resulting from an instruction given within the working hours is the business-use printing.

According to this configuration, it is possible to determine that the printing resulting from the instruction given within working hours is business-use printing, by using the attendance information managed by the attendance management system.

(I) In the aforementioned printing system, the printing system may further include an information terminal giving an instruction to perform printing to the printing apparatus, in which the information terminal may be properly selected from a first information terminal giving an instruction to perform the private-use printing and a second information terminal giving an instruction to perform the business-use printing, and the determination section may determine based on unique information received from the information terminal by the printing apparatus, whether the printing resulting from the instruction given by the information terminal is the business-use printing or the private-use printing.

According to this configuration, it is possible to determine whether the printing resulting from the instruction given to the printing apparatus is business-use printing based on unique information received by the printing apparatus from the information terminal.

(J) In the aforementioned printing system, the printing system may further include a calculation section calculating a cost depending on the amount of printing agent determined to be discarded in the business-use printing as at least a part of cost associated with the business-use printing.

According to this configuration, the owner of the company or the like is able to pay to the remote worker, the cost depending on the amount of printing agent discarded in business-use printing as at least a part of the cost associated with business-use printing.

(K) In the aforementioned printing system, the calculation section may calculate a printing cost depending on the number of prints in the business-use printing and a printing agent cost depending on the amount of printing agent determined to be discarded in the business-use printing.

According to this configuration, as the cost associated with business-use printing, it is possible to pay the printing agent cost depending on the amount of printing agent discarded, in addition to the cost depending on the number of prints.

(L) In the aforementioned printing system, the waste agent collecting section may include a replaceable first waste agent accommodating section accommodating the collected waste agent, and the cost calculated by the calculation section may include a portion of cost of a new second waste agent accommodating section by which the first waste agent accommodating section filled with the waste agent is replaced, depending on the amount of waste agent determined to be discarded in the business-use printing.

According to this configuration, it is also possible to pay to the remote worker or the like, the portion of the cost required to replace the waste agent accommodating section, depending on the amount of waste agent discarded in business.

(M) In the aforementioned printing system, the first place may be a company while the second place is a home of an employee who owns the printing apparatus. According to this configuration, when an employee as the remote worker or the like working from home uses the privately-owned printing apparatus to perform business-use printing, it is possible to pay to the employee, the cost depending on the amount of printing agent discarded in business-use printing.

(N) A printing apparatus is a printing apparatus used in business-use printing and private-use printing, the printing apparatus including: a printing section performing printing on a medium using a printing agent that is supplied from a printing agent accommodating section accommodating the printing agent; a waste agent collecting section collecting as a waste agent, a portion of the printing agent that is consumed by the printing section but is discarded without being used in printing on the medium; a determination section determining whether the printing agent as the waste agent is discarded in the business-use printing or the private-use printing; and an estimation section estimating the amount of printing agent determined by the determination section to be discarded in the business-use printing.

According to this configuration, when the remote worker performs business-use printing by using the printing apparatus, the owner of the company or the like is able to pay to the remote worker, the cost depending on the amount of printing agent discarded in business-use printing as at least a part of the cost of business-use printing.

What is claimed is:

1. A printing system comprising:
a server provided in a first place; and
a printing apparatus that is provided in a second place and is used in business-use printing and private-use printing, wherein
the printing apparatus includes:
  a printing section performing printing on a medium using a printing agent;
  a waste agent collecting section collecting as a waste agent, a portion of the printing agent that is consumed by the printing section but is discarded without being used in printing on the medium;
  a determination section determining whether the printing agent as the waste agent is discarded in the business-use printing or the private-use printing; and
  an estimation section estimating an amount of printing agent determined by the determination section to be discarded in the business-use printing.

2. The printing system according to claim 1, wherein
the printing apparatus includes a maintenance section performing maintenance of the printing section,
the amount of printing agent determined to be discarded in the business-use printing is an amount of printing agent discarded from the printing section by maintenance,
the determination section determines whether the maintenance is business-related maintenance to reduce printing failure at the business-use printing or private-related maintenance to reduce printing failure at the private-use printing, and
the estimation section estimates the amount of printing agent discarded by the business-related maintenance.

3. The printing system according to claim 1, wherein
the estimation section estimates, based on the number of business-use prints printed by the printing apparatus, the amount of printing agent determined to be discarded in the business-use printing.

4. The printing system according to claim 2, wherein
the maintenance is cleaning of the printing section or flushing preventing ejection failure during printing.

5. The printing system according to claim 4, wherein the determination section includes:
- a first determination section determining whether printing resulting from an accepted instruction is the business-use printing or the private-use printing; and
- a second determination section determining that the cleaning is business-related cleaning accompanying the business-use printing when the cleaning has a relationship satisfying a setting condition with the business-use printing.

6. The printing system according to claim 2, wherein the printing apparatus includes:
- a controller controlling the maintenance section; and
- an inspection section inspecting the printing section,
- upon accepting an instruction to perform printing, the controller causes the inspection section to perform inspection of the printing section before starting the printing,
- when a result of inspection indicates that printing failure is likely to occur, the controller causes the maintenance section to perform automatic cleaning of the printing section, and
- when the printing resulting from the accepted instruction is the business-use printing, the determination section determines that the automatic cleaning is business-related cleaning accompanying the business-use printing.

7. The printing system according to claim 1, further comprising
- an information terminal giving an instruction to perform printing to the printing apparatus, wherein
- the information terminal includes as a print driver outputting printing data to the printing apparatus, a first print driver dedicated to business and a second print driver for general purpose,
- the determination section is provided for the printing apparatus, and
- the determination section determines that the printing resulting from the given instruction is the business-use printing when the print driver that outputted the printing data received by the printing apparatus is the first print driver and determines that the printing resulting from the given instruction is the private-use printing when the print driver that outputted the printing data received by the printing apparatus is the second print driver.

8. The printing system according to claim 1, wherein
- the server includes an attendance management system managing whether it is within working hours or outside working hours, and
- the determination section determines based on attendance information managed by the attendance management system, that printing resulting from an instruction given within the working hours is the business-use printing.

9. The printing system according to claim 1, further comprising
- an information terminal giving an instruction to perform printing to the printing apparatus, wherein
- the information terminal is properly selected from a first information terminal giving an instruction to perform the private-use printing and a second information terminal giving an instruction to perform the business-use printing, and
- the determination section determines based on unique information received from the information terminal by the printing apparatus, whether the printing resulting from the instruction given by the information terminal is the business-use printing or the private-use printing.

10. The printing system according to claim 1, further comprising
- a calculation section calculating a cost depending on the amount of printing agent determined to be discarded in the business-use printing as at least a part of cost associated with the business-use printing.

11. The printing system according to claim 10, wherein
- the calculation section calculates a printing cost depending on the number of prints in the business-use printing and a printing agent cost depending on the amount of printing agent determined to be discarded in the business-use printing.

12. The printing system according to claim 10, wherein
- the waste agent collecting section includes a replaceable first waste agent accommodating section accommodating the collected waste agent, and
- the cost calculated by the calculation section includes a portion of cost of a new second waste agent accommodating section by which the first waste agent accommodating section filled with the waste agent is replaced, depending on the amount of waste agent determined to be discarded in the business-use printing.

13. The printing system according to claim 1, wherein
- the first place is a company while the second place is a home of an employee who owns the printing apparatus.

14. A printing apparatus used in business-use printing and private-use printing, the printing apparatus comprising:
- a printing section performing printing on a medium using a printing agent that is supplied from a printing agent accommodating section accommodating the printing agent;
- a waste agent collecting section collecting as a waste agent, a portion of the printing agent that is consumed by the printing section but is discarded without being used in printing on the medium;
- a determination section determining whether the printing agent as the waste agent is discarded in the business-use printing or the private-use printing; and
- an estimation section estimating an amount of printing agent determined by the determination section to be discarded in the business-use printing.

* * * * *